United States Patent [19]
Miyamoto

[11] Patent Number: 5,168,026
[45] Date of Patent: Dec. 1, 1992

[54] BIS-AZO COMPOUND AND ELECTROPHOTOGRAPHIC PHOTOSENSITIVE MEMBER WITH A LIGHT RECEIVING LAYER CONTAINING SAID BIS-AZO COMPOUND

[75] Inventor: Eiichi Miyamoto, Osaka, Japan

[73] Assignee: Mita Industrial Co., Ltd., Osaka, Japan

[21] Appl. No.: 834,557

[22] PCT Filed: Jun. 12, 1991

[86] PCT No.: PCT/JP91/00789
§ 371 Date: Feb. 11, 1992
§ 102(e) Date: Feb. 11, 1992

[87] PCT Pub. No.: WO 91/19768
PCT Pub. Date: Dec. 26, 1991

[30] Foreign Application Priority Data

Jun. 12, 1990 [JP] Japan ................... 2-155759
Jun. 12, 1990 [JP] Japan ................... 2-155760

[51] Int. Cl.$^5$ .................. G03G 5/06; C09B 35/039
[52] U.S. Cl. ...................... 430/73; 534/739; 534/653
[58] Field of Search ............. 430/73; 534/739, 653

[56] References Cited

U.S. PATENT DOCUMENTS 5,093,219 3/1992 Makino et al. ................ 430/73
5,106,712 4/1992 Kitatani et al. ................ 430/73

Primary Examiner—John Goodrow
Attorney, Agent, or Firm—Wenderoth, Lind & Ponack

[57] ABSTRACT

A bis-azo compound represented by the following general formula and an electrophotographic photosensitive member having a light receiving layer containing said bis-azo compound.

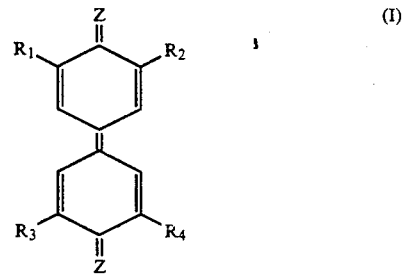

(I)

[wherein, two of the substituent groups $R_1$ to $R_4$ are respectively an azo group having a coupler residue which is bonded either directly or through a phenyl ring to the diphenoquinone skeleton, and the remaining two substituent groups are respectively hydrogen atom, alkyl group, alkenyl group, hydroxyl group, alkoxy group, carboxyl group, aryl group, halogen atom or cyano group wherein the two substituent groups may be identical or different each other, and Z is oxygen atom or sulfur atom.]

2 Claims, 3 Drawing Sheets

BIS-AZO COMPOUND AND ELECTROPHOTOGRAPHIC PHOTOSENSITIVE MEMBER WITH A LIGHT RECEIVING LAYER CONTAINING SAID BIS-AZO COMPOUND

FIELD OF THE INVENTION

The present invention relates to a novel bis-azo compound having a diphenoquinone skeleton. The present invention also relates to an organic electrophotographic photosensitive member with a light receiving layer containing said bis-azo compound, which provides improved electrophotographic characteristics.

BACKGROUND OF THE INVENTION

As for azo-compounds, it is known that they exhibit a charge-generating function. Because of this, have been expected to be usable as a charge-generating material, and various studies have been made of those azo-compounds. For example, Japanese Laid-open patent application 47-37543 proposes an organic electrophotographic photosensitive member prepared by using an azo-compound.

However, the known azo-compounds are mostly such that are narrow with respect to visible light region or exhibit a strong absorption in near infrared region and do not exhibit a photosensitive wave property in the entire of visible light region.

Those organic electrophotographic photosensitive members prepared by using such azo-compounds are such that are poor in durability since a reduction is caused not only in the photosensitive characteristics but also in the sensitivity upon repeated use.

Now, the so-called Carlson's process has been wildly used in order to obtain copied images using an electrophotographic photosensitive member. The Carlson's process includes charging step wherein the photosensitive member is uniformly sensitized with corona charge, exposure step wherein the sensitized photosensitive member is subjected to exposure of an original image to form a latent image corresponding to the original image on the surface thereof, development step wherein the latent image is developed with a toner developer to form a toner image, transfer step wherein the toner image is transferred onto a transfer sheet such as paper, fixing step wherein the transferred toner image on the transfer sheet is fixed, and cleaning step wherein the residual toner on the photosensitive member is removed. In order to obtain a high quality copied image in the Carlson's process, it is required for the electrophotographic photosensitive member to excel in both charging characteristics and photosensitive characteristics and to be low in residual potential after exposure. As the electrophotographic material which satisfies these requirements, there are known inorganic photoconductors of selenium, cadmium sulfide, etc. However as for such inorganic photoconductors, there are disadvantages that they are noxious and are of a relatively high production cost.

In view of this, instead of those noxious materials, there have been proposed a number of organic electrophotographic photosensitive members prepared using organic materials, for example, as found in the foregoing literature.

An organic electrophotographic photosensitive member has been spotlighted since it excels in both processability and economy and is large in freedom. And various studies have been made thereof. The conventional organic electrophotographic photosensitive member has a photosensitive layer comprising a charge generatiing material capable of generating electric charge upon exposure and a charge transporting material capable of transporting the electric charge generated.

In order for the organic electrophotographic photosensitive member to satisfy the various conditions desired therefor, it is necessary to appropriately select the charge generating material and the charge transporting material.

However, as for the conventional organic electrophotographic photosensitive member in which a known charge generating material is used, there are problems that it is difficult to precisely reproduce a color original in particular depending upon the absorption wave characteristics thereof and the sensitivity as a whole is insufficient.

In view of the above, there is an increased demand for earlier provision of an effective charge generating material which efficiently generates photocarrier upon light irradiation and if possible, also exhibits a function of transporting electron.

SUMMARY OF THE INVENTION

The present inventor has made extensive studies in order to comply with the above demand in view of various characteristics of the known azo-compounds although they are not practically applicable. As a result, the present inventor has developed new bis-azo compounds, which have not known in the past, and has found that said bis-azo compounds are effective to eliminate the problems found in the known organic electrophotographic photosensitive members, whereby the present invention has been accomplished.

The present invention therefore makes it an object to provide new bis-azo compounds having a diphenoquinone skeleton.

Other object of the present invention is to provide new bis-azo compounds having a plane structure and a diphenoquinone structure capable of exhibiting an electron transporting property as the central skeleton and which exhibit an excellent carrier generating function and an excellent electron transporting function.

A further object of the present invention is to provide new bis-azo compounds of a high industrial utility value, having a plane structure and a dipenoquinone structure capable of exhibiting an electron transporting property as the central skeleton, which exhibit an excellent carrier generating function and an excellent electron transporting function, and which are not only usable as a coloring pigment but also applicable in electronic devices such as organic photoconductors, photoelectric conversion elements, optical information memory elements, etc.

A further object of the present invention is to provide an organic electrophotographic photosensitive member having a light receiving layer having excellent charge generating characteristics and excellent electron transporting characteristics.

A further object of the present invention is to provide an organic electrophotographic photosensitive member with a light receiving layer formed using a new bis-azo compound having a plane structure and a dipenoquinone structure capable of exhibiting an electron transporting property as the central skeleton and which exhibit an excellent carrier generating function and an excellent electron transporting function.

The foregoing new azo-compounds to be provided according to the present invention are those represented by the following general formula (I):

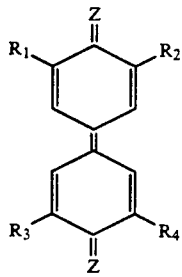

(I)

wherein two of the substituent groups $R_1$ to $R_4$ are respectively an azo group having a coupler residue which is bonded either directly or through a phenyl ring to the diphenoquinone skeleton, and the remaining two substituent groups are respectively hydrogen atom, alkyl group, alkenyl group, hydroxyl group, alkoxy group, carboxyl group, aryl group, halogen atom or cyano group wherein the two substituent groups may be identical or different each other, and Z is oxygen atom or sulfur atom.

The bis-azo compound represented by the general formula (I) according to the present invention is identified by having a diphenoquinone structure as the central skeleton and taking a plane structure as for the molecular structure as a compound and in which r-conjugate electrons are distributed in the entire of the central structure. In addition, the bis-azo compound is of the structure in which the diphenoquinone structure is of a planar compound structure and the molecular structure as a compound is in a plane state. The bis-azo compound behaves such that inter-molecular overlapping is accelerated to strengthen the inter-molecular mutual actions upon use. Because of this, the bis-azo compound exhibits an excellent carrier generating function and an excellent electron transporting function.

In consequence, the bis-azo compound represented by the general formula (I) to be provided according to the present invention is not only usable as a coloring pigment but also applicable in electronic devices such as organic photoconductors, photoelectric conversion elements, optical information memory elements, etc., and thus, it is of a high industrial utility value.

The organic electrophotographic photosensitive member to be provided according to the present invention basically comprises a conductive substrate and a light receiving layer disposed on said conductive substrate, said light receiving layer being formed using the bis-azo compound represented by the foregoing general formula (I). The light receiving layer may be of a single layer structure or a multilayered structure.

The organic electrophotographic photosensitive member to be provided according to the present invention excels in photosensitivity and durability due to use of the bis-azo compound, and it can be used not only in various electrophotographic copying machines but also in laser beam printer, CTR printer, LED printer, liquid crystal printer, laser processing, or the like.

DESCRIPTION OF THE PREFERRED EMBODIMENTS

Examples of the bis-azo compound represented by the foregoing general formula (I) to be provided according to the present invention Typical examples of the bis-azo compound represented by the foregoing general formula (I) to be provided according to the present invention are those azo-compounds represented by the following structural formulas (II) to (VII).

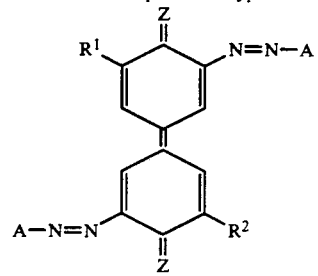

Bis-azo compound of Type 1

(II)

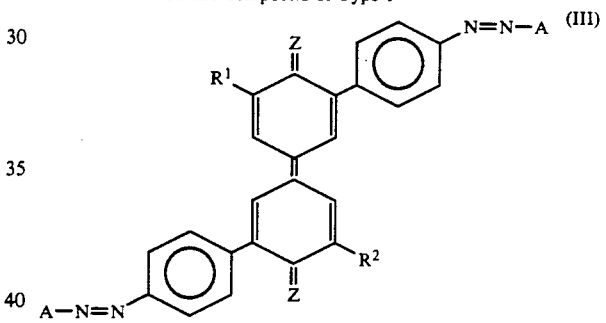

Bis-azo compound of Type 1'

(III)

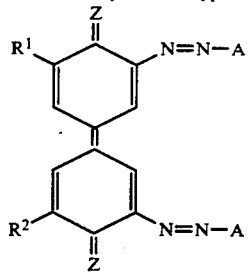

Bis-azo compound of Type 2

(IV)

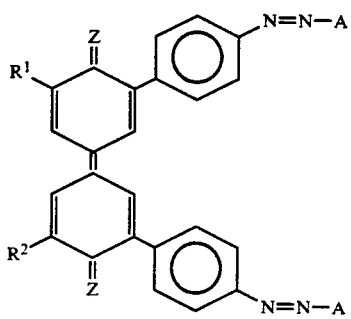

Bis-azo compound of Type 2'

(V)

Bis-azo compound of Type 3

-continued

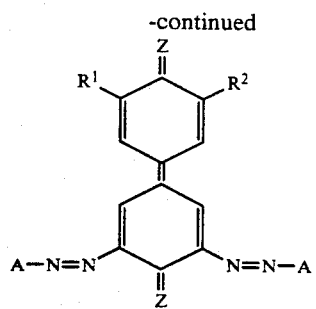
(VI)

Bis-azo compound of Type 3'

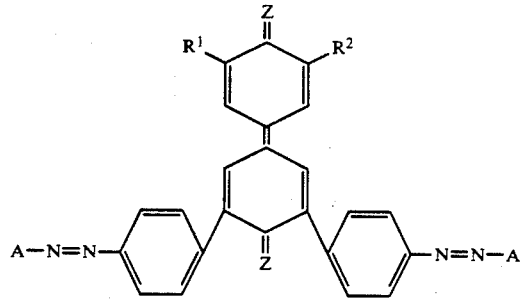
(VII)

In each of the goregoing structural formulas (II) to (VII), $R^1$ may be the same as or different from $R^2$ wherein they are respectively hydrogen atom, alkyl group, alkenyl group, hydroxyl group, alkoxy group, carboxyl group, alkoxycarbonyl group, acyl group, aryl group, halogen atom or cyano group, and Z is oxygen atom or sulfur atom.

The coupler residue may be a coupler which is used in azo dyes. Specific examples of such coupler can include the following coupler residues (a) to (g).

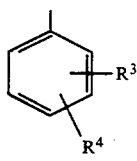
(a)

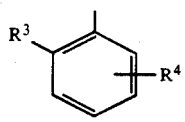
(b)

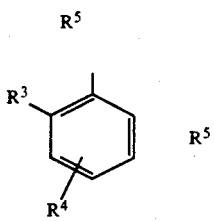
(c)

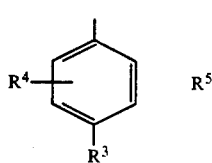
(d)

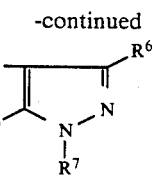
(e)

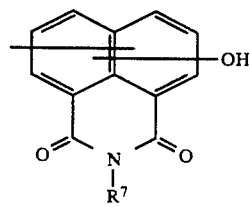
(f)

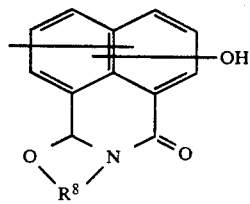
(g)

In each of the above coupler residues, $R^3$ indicates hydroxy group, a group

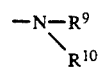

(wheein $R^9$ may be the the same as or different from $R^{10}$ and they are respectively hydrogen atom or alkyl group) or a group: $-NHSO_2R^{11}$ (wherein $R^{11}$ is hydrogen atom, alkyl group, alkenyl group or aryl group).

$R^4$ is hydrogen atom, halogen atom, alkyl group, alkoxy group, alkoxycarbamoyl group, carboxyl group, sylvamoyl group, sulfamoyl group or aryl group. The alkyl group or the alkoxy group may have a substituent group such as halogen atom, phenyl group, naphthyl goup, nitro group, cyano group, etc. Likewise, the carbamoyl group or the sulfamoyl group may have a substituent group such as halogen atom, phenyl group, naphthyl group, alkyl group, alkenyl group, carbonyl group, carboxyl group, etc.

$R^5$ indicates an atomic group necessary for the formation of an aromatic ring, an aliphatic ring or a heterocyclic ring in condensation with a benzene ring having $R^3$ and $R^4$, wherein these rings may have such substituent groups as above described.

$R^6$ is hydrogen atom, amino group, N-substituted amino group, alkyl group, alkenyl group, hydroxy group, carbamoyl group, carboxyl group or alkoxycarbonyl group, wherein the alkyl group and the alkenyl group respectively may have such substituent groups as above described.

$R^7$ is hydrogen atom, alkyl group or aryl gorup, wherein the alkyl group or the aryl gorup may have such substituent groups as above described.

$R^8$ is phenylene group or naphthylene group, wherein the phenylene group or the naphthylene group may have such substituent groups as above described.

The alkyl group can include alkyl groups of 1 to 6 carbon atoms such as methyl, ethyl, propyl, isopropyl, butyl, isobutyl, tert-butyl, pentyl, hexyl groups, etc.

The alkenyl group can include alkenyl groups of 2 to 6 carbon atoms such as vinyl, allyl, 2-butenyl, 3-butenyl, 1-methylallyl, 2-pentenyl, 2-hexenyl groups, etc.

The halogen atom can include fluorine atom, chlorine atom, bromine atom and iodine atom.

The alkoxy group can include alkoxy groups of 1 to 6 carbon atoms such as methoxy, ethoxy, propoxy, isopropoxy, butoxy, isobutoxy, tert-butoxy, pentyloxy, hexyloxy groups, etc.

The alkoxycarbonyl group can include lower alkoxycarbonyl groups having an alkoxy part of 1 to 6 carbon atoms such as methoxycarbonyl, ethoxycarbonyl, propoxycarbonyl, isopropoxycarbonyl, butoxycarbonyl, isobutoxycarbonyl, pentyloxycarbonyl, hexyloxycarbonyl groups, etc.

In the $R^5$, the atomic group of forming an aromatic ring in condensation with a benzene ring having $R^3$ and $R^4$ can include alkylene groups of 1 to 4 carbon atoms such as methlene, ethylene, propylene, butylene groups, etc. Likewise, the heterocyclic ring formed in condensation of the $R^5$ with a benzene ring having $R^3$ and $R^4$ can include benzofuranyl, benzothiophenyl, indolyl, 1H-indolyl, benzooxazoly, benzothiazoly, 1H-indazolyl, benzoimidazolyl, chromenyl, chromanyl, isochromanyl, quinolinyl, isoqinoliny, cinnolinyl, phthalazinyl, quinazolinyl, quinoxaliny. benzophellanyl, carbazolyl. xanthenyl. acridinyl, phenanthridinyl, phenazinyl, phenaxadinyl, thianthrenyl rings, etc.

Each of the bis-azo compounds represented by the foregoing structural formulas (II) to (VII) includes those compounds having substituent groups shown in Table 1.

Specific examples of such compound are bis-azo compounds No. 1 to No. 30 as will be under mentioned. Each of the reference numerals in Table 1 is equivalent to the corresponding numerical notation for the compound in the following.

Bis-azo compounds represented by the structural formula (II)

No. 1 (Type 1)
2,2'-bis[2-hydroxy-3-(phenylcarbamoyl) -1-naphthylazo]-6,6'-dimethyl-diphenoquinone No. 2 (Type 1)
2,2'-bis[2-hydroxy-3-(N-methylamino)-1-phenylazo]-6-methoxy-6'-methyl-diphenoquinone No. 3 (Type 1).
2,2'-bis[2-hydroxy-3-(N-methylamino)-1-phenylazo]-6-ethyl-6'-methyl-diphenoquinone No. 4 (Type 1)
2,2'-bis[2-hydroxy-3-(phenylcarbamoyl)-1-naphthylazo]6-carboxyl-6'-hydroxymethyl-diphenoquinone No. 5 (Type 1)
2,2'-bis[2-sulfamyl-4-(phenylsulfonylamino) -1phenylazo]-6,6'-dichloro-diphenoquinone No. 6 (Type 1)
2,2'-bis[4-(ethylsulfonylamino)-1-phenylazo]-6,6'-dicyano-diphenoquinone No. 7 (Type 1)
2,2'-bis[2-hydroxy-4-amino-1-naphtylazo]-6,6'-dimethyl-diphenoquinone No. 8 (Type 1)
2,2'-bis[4-(N,N-dimethylamino)-6-methyl -1-naphtylazo]-6,6'-dimethyl-diphenoquinone No. 9 (Type 1)
2,2'-bis[5-amino-4-indolylazo]-6,6'-dimethyldiphenoquinone No. 10 (Type 1)
2,2'-bis[5-hydroxy-4-indolylazo]-6,6'-dimethyldiphenoquinone No. 11 (Type 1)
2,2'-bis[5-hydroxy-4-isobenzoxazolyazo]-6-methyl-6'-m-tolyl-diphenoquinone No. 12 (Type 1)
2,2'-bis[5-hydroxy-4-benzo(b)thienylazo]-6-methyl-6'-m-tolyl-diphenoquinone No. 13 (Type 1)
2,2'-bis[1-hydroxy-2-naphthylazo ]-6,6'-dimethyldiphenoquinone No. 14 (Type 1)
2,2'-bis[1-hydroxy-4-methyl-2-naphthylazo]-6-chloro-6'-phenyl-diphenoquinone No. 15 (Type 1)
2,2'-bis[5-hydroxy-3-methyl-6-isoquinolylazo]-6-methyl-6'-phenyl-diphenoquinone No. 16 (Type 1)
2,2'-bis[1-hydroxy-7-ethyl-2-naphthylazo]-6-cyano-6'-phenyl-diphenoquinone No. 17 (Type 1)
2,2'-bis[5-hydroxy-3-methyl-6-isoquinolylazo]-6,6'-diphenyl-diphenoquinone No. 18 (Type 1)
2,2'-bis[7-carbamoyl-1-hydroxy-2-naphtylazo]-6,6'-dimethyl-diphenoquinone No. 19 (Type 1)
2,2'-bis[5-hydroxy-1-methyl-4-pyrazolylazo]-6,6 -dimethyl-diphenoquinone No. 20 (Type 1)
2,2'-bis[3-carbamoyl-1-ethyl-5-hydroxy -4-pyrazolylazo]-6,6'-dimethyl-diphenoquinone No. 21 (Type 1)
2,2'-bis[3-carboxyl-1-propyl-5-hydroxy-4-pyrazolylazo]-6-methyl-6'-phenyl-diphenoquinone No. 22 (Type 1)
2,2'-bis[3-ethoxycarbonyl-5-hydroxy-1-propyl-4-pyrazolylazo]-6-naphthyl-6'-phenyl-diphenoquinone No. 23 (Type 1) 2,2'-bis[3-amino-1-phenyl-4-pyrazolylazo]-6,6'-dimethyl-diphenoquinone No. 24 (Type 1)
2,2'-bis[3-carbamoyl-5-hydroxy-1-phenyl-4-pyrazolylazo]-6'-methyl-6-methoxycarbonyl-diphenoquinone No. 25 (Type 1)
2,2'-bis[3-hydroxy-1,8-(N-phenylimido) -4-naphthylazo-6,6'-dimethyl-diphenoquinone No. 26 (Type 1)
2,2'-bis[4-hydroxy-1,8-(N-phenylimido) -3-naphthylazo]-6,6'-dimethyl-diphenoquinone No. 27 (Type 1)
2,2'-bis[4-hydroxy-imidazolperinoneaz]-6,6'-dimethyldiphenoquinone No. 28 (Type 1)
2,2'-bis[2-hydroxy-naphthazolperinoneazo]-6,6'-dinaphthyl-diphenoquinone No. 29 (Type 1)
2,2'-bis[2-hydroxy-3-(phenylcarbamoyl) -1-naphthylazo]-6,6'-dimethyl-diphenoquinone No. 30 (Type 1)
2,2'-bis[2-hydroxy-5-methyl -1-phenylazo]-6,6'-dimethyl-diphenoquinone Bis-azo compounds represented by the structural formula (III)

No. 1 (Type 1')
2,2'-bis{4-[2-hydroxy-3-(phenylcarbamoyl)-1naphthylazo]-phenyl}-6,6'-dimethyl-diphenoquinone No. 2 (Type 1')
2,2'-bis{4-[2-hydroxy-3-(N-methylamino)-1-phenylazo]phenyl}-6-methoxy-6'-methyl-diphenoquinone No. 3 (Type 1')
2,2'-bis{4-[2-hydroxy-3-(N-methylamino)-1-phenylazo]pheny}-6-ethyl-6'-methyl-diphenoquinone No. 4 (Type 1')
2,2'-bis{4-[2-hydroxy-3-(phenylcarbamoyl)-1-naphthylazo]-phenyl}-6-carboxyl-6'-hydroxymethyldiphenoquinone No. 5 (Type 1')
2,2'-bis{4-[2-sulfamyl-4-(phenylsulfonylamino)-1phenylazo]-phenyl}-6,6'-dichloro-diphenoquinone No. 6 (Type 1')
2,2'-bis{4-[4-(ethylsulfonylamino)-1-phenylazo]-phenyl}-6,6'-dicyano-diphenoquinone No. 7 (Type 1')
2,2'-bis{4-[2-hydroxy-4-amino-1-naphthylazo]-pheny}-6,6'-dimethyl-diphenoquinone No. 8 (Type 1')
2,2'-bis{4-[4-(N,N-dimethylamino)-6-methyl-1-naphthylazo]-phenyl}-6,6'-dimethyl-diphenoquinone No. 9 (Type 1')
2,2'-bis{4-[5-amino-4-indolylazo]-phenyl}-6,6'-dimethyl-diphenoquinone No. 10 (Type 1')
2,2'-bis{4-[5-hydroxy-4-indolylazo]-phenyl}-6,6'-dimethyl-diphenoquinone No. 11 (Type 1')
2,2'-bis{4-[5-hydroxy-4-inbenzoxazolylazo]-pheny}-6-methyl-6'-m-tolyl-diphenoquinone No. 12 (Type 1')
2,2'-bis{4-[5-hydroxy-4-benzo(b)thienylazo]-phenyl}-6-ethyl-6'-m-tolyl-diphenoquinone No. 13 (Type 1')
2,2'-bis{4-[1-hydroxy-2-naphthylazo]-phenyl}-6,6'-dimethyl-diphenoquinone No. 14 (Type 1')
2,2'-bis{4-[1-hydroxy-4-methyl-2-naphthylazo]-phenyl}-6-chloro-6'-phenyl-diphenoquinone No 15 (Type 1')
2,2'-bis{4-[5-hydroxy-3-methyl-6-isoquinolylazo]-phenyl}-6-methyl-6'-phenyl-diphenoquinone No. 16 (Type 1')
2,2'-bis{4-[1-hydroxy-7-ethyl-2-naphthylazo]-phenyl}-6-cyano-6'-phenyl-diphenoquinone No. 17 (Type 1')
2,2'-bis{4-[5-hydroxy-3-methyl-6-isoquinolylazo]-pheny}-6,6'-diphenyl-diphenoquinone No. 18 (Type 1')
2,2'-bis{4-[7-carbamoyl-1-hydroxy-2-naphthylazo]-phenyl}-6,6'-dimethyl-diphenoquinone No. 19 (Type 1')
2,2'-bis{4-[5-hydroxy-1-methyl-4-pyrazolylazo]-phenyl}-6,6'-dimethyl-diphenoquinone No. 20 (Type 1')
2,2'-bis{4-[3-carbamoyl-1-ethyl-5-hydroxy-4-pyrazolylazo]-phenyl}-6,6'-dimethyl-diphenoquinone
21 No. 21 (Type 1')
2,2'-bis{4-[3-carboxyl-1-propyl-5-hydroxy-4-pyrazolylazo]-phenyl}-6-methyl-6'-phenyl-diphenoquinone No. 22 (Type 1')
2,2'-bis{4-[3-ethoxycarbonyl-5-hydroxy-1-propyl-4-pyrazolylazo]-phenyl}-6-naphthyl-6'-phenyl-diphenoquinone No. 23 (Type 1')
2,2'-bis{4-[3-amino-1-phenyl-4-pyrazolylazo]-phenyl}-6,6'-dimethyl-diphenoquinone No. 24 (Type 1')
2,2'-bis{4-[3-carbamoyl-5-hydroxy-1-phenyl-4-pyrazolylazo]-phenyl}-6'-methyl-6-methoxycarbonyl-diphenoquinone No. 25 (Type 1')
2,2'-bis{4-[3-hydroxy-1,8-(N-phenylimido)-4naphthylazo]-phenyl}-6,6'-dimethyl-diphenoquinone No. 26 (Type 1')
2,2'-bis }4-[4-hydroxy-1,8-(N-phenylimido)-3naphthylazo]-phenyl}-6,6'-dimethyl-diphenoquinone No. 27 (Type 1')
2,2'-bis{4-[4-hydroxy-imidazolperinonazo]phenyl}-6,6'-dimethyl-diphenoquinone No. 28 (Type 1')
2,2'-bis{4-[6-hydroxy-naphthazolperinonazo]-phenyl}-6,6'-dinaphthyl-diphenoquinone No. 29 (Type 1') 2,2'-bis{4-[2-hydroxy-3-(phenylcarbamoyl)-1-naphthylazo]-phenyl}-6,6'-dimethyl-diphenothione No. 30 (Type 1')
2,2'-bis{4-[2-hydroxy-5-methyl-1-phenylazo]-phenyl}-6,6'-dimethyl-diphenothione Bis-azo compounds represented by the structural formula (IV)

No. 1 (Type 2)
2,6'-bis[2-hydroxy-3-(phenylcarbamoyl)-1-naphthylazo]-2',6-dimethyl-diphenoquinone No. 2 (Type 2)
2,6'-bis[2-hydroxy-3-(N-methylamino)-1-phenylazo]-2'-methoxy-6-methyl-diphenoquinone No. 3 (Type 2)
2,6'-bis[2-hydroxy-3-(N-methylamino)-1-phenylazo]-2'-ethyl-6-methyl-diphenoquinone No. 4 (Type 2)
2,2'-bis[2-hydroxy-3-(phenylcarbamoyl)-1-naphthylazo]-2'-carboxyl-6'-hydroxymethyl-diphenoquinone No. 5 (Type 2)
2,6'-bis[2-sulfamyl-4-(phenylsulfonylamino)-1phenylazo]-2',6-dichloro-diphenoquinone No. 6 (Type 2)
2,6'-bis [4-(ethylsulfonylamino)-1-phenylazo]-2',6-dicyano-diphenoquinone No. 7 (Type 2)
2,6'-bis[2-hydroxy-4-amino-1-naphthylazo]-2',6 dimethyl-diphenoquinone No. 8 (Type 2)
2,6'-bis[4-(N,N-dimethylamino)-6-methyl-1-naphthylazo]-2',6-dimethyl-diphenoquinone No. 9 (Type 2)
2,6'-bis[5-amino-4-indolylazo]-2',6-dimethyldiphenoquinone No. 10 (Type 2)
2,6'-bis[5-hydroxy-4-indolylazo]-2', 6-dimethyldiphenoquinone No. 11 (Type 2)
2,6'-bis[5-hydroxy-4-inbenzoxazolylazo]-2'-methyl-6-m-tolyl-diphenoquinone No. 12 (Type 2)
2,6'-bis[5-hydroxy-4-benzo(b)thienylazo]-2'-ethyl-6-m-tolyl-diphenoquinone No. 13 (Type 2)
2,6'-bis[1-hydroxy-2-naphthylazo]-2', 6-dimethyldiphenoquinone No. 14 (Type 2)
2,6'-bis[1-hydroxy-4-methyl-2-naphthylazo]-2'-chloro-6-phenyl-diphenoquinone No. 15 (Type 2)
2,6'-bis[5-hydroxy-3-methyl-6-isoquinolylazo]-2'-methyl-6-phenyl-diphenoquinone No. 16 (Type 2)
2,6'-bis[1-hydroxy-7-ethyl-2-naphthylazo]-2'-cyano-6-phenyl-diphenoquinone No. 17 (Type 2)
2,6'-bis[5-hydroxy-3-methyl-6-isoquinolylazo]-2', 6-diphenyl-diphenoquinone No. 18 (Type 2)
2,6'-bis[7-carbamoyl-1-hydroxy-2-naphthylazo]-2', 6-dimethyl-diphenoquinone No. 19 (Type 2)
2,6'-bis [5-hydroxy-1-methyl-4-pyrazolylazo]-2', 6-dimethyl-diphenoquinone No. 20 (Type 2)
2,6'-bis[3-carbamoyl-1-ethyl-5-hydroxy-4-pyrazolylazo]-2', 6-dimethyl-diphenoquinone No. 21 (Type 2)
2,6'-bis[3-carboxyl-1-propyl-5-hydroxy -4-pyrazolylazo]-2'-methyl-6-phenyl-diphenoquinone No. 22 (Type 2)
2,6'-bis[3-ethoxycarbonyl-5-hydroxy-1-propyl-4-pyrazolylazo-2'-naphthyl-6-phenyl-diphenoquinone No. 23 (Type 2)
2,6'-bis[3-amino-1-phenyl-4-pyrazolylazo]-2', 6-dimethyl-diphenoquinone No. 24 (Type 2)
2,6'-bis[3-carbamoyl-5-hydroxy-1-phenyl -4-pyrazolylazo]-2'-methyl-6-methoxycarbonyl-diphenoquinone No. 25 (Type 2)
2,6'-bis[3-hydroxy-1,8-(N-phenylimido) -4-naphthylazo]-2', 6-dimethyl-diphenoquinone No. 26 (Type 2)
2.6'-bis[4-hydroxy-1,8-(N-phenylimido) -3-naphthylazo]-2',6-dimethyl-diphenoquinone No. 27 (Type 2)
2,6'-bis[4-hydroxy-imidazolperinonazo]-2', 6-dimethyldiphenoquinone No. 28 (Type 2)
2,6'-bis[6-hydroxy-naphthazolperinonazo]-2', 6-dinaphthyl-diphenoquinone No. 29 (Type 2)
2,6'-bis[2-hydroxy-3-(phenylcarbamoyl) -1-naphthylazo]-2',6-dimethyl-diphenothione No. 30 (Type 2)
2,2'-bis[2-hydroxy-5-methyl-1-phenylazo]-2',6-dimethyl-diphenothione Bis-azo compounds represented by the structural formula (V)

No. 1 (Type 2')
2,6'-bis{4-[2-hydroxy-3-(phenylcarbamoyl)-1naphthylazo]phenyl}-2',6-dimethyl-diphenoquinone No. 2 (Type 2') 2,6'-bis{4-[2-hydroxy-3-(N-methylamino)-1-phenylazo]phenyl}-2'-methoxy-6-methyl-diphenoquinone No. 3 (Type 2')
[2,6'-bis{4-[2-hydroxy-3-(N-methylamino)-1-phenylazo]- phenyl}-2'-ethyl-6-methyl-diphenoquinone No. 4 (Type 2')
2,6'-bis{4-[2-hydroxy-3-(phenylcarbamoyl)-1naphthylazo]-phenyl}-2'-carboxyl-6-hydroxymethyldiphenoquinone No. 5 (Type 2')
[2,6'-bis {4-2-sulfamyl-4-(phenylsulfonylamino)-1phenylazo]-phenyl}-2',6-dichloro-diphenoquinone No. 6 (Type 2')
2,6'-bis{4-[4-(ethylsulfonylamino) -1-phenylazo]-phenyl}-2',6-dicyano-diphenoquinone No. 7 (Type 2')
2,6'-bis{4- [2-hydroxy-4-amino -1-naphthylazo]-phenyo]-2',6-dimethyl-diphenoquinone No. 8 (Type 2')
2,2'-bis{4-[4-(N,N-dimethylamino) -6-methyl-1-naphthylazo]-phenyl}-2',6-dimethyl-diphenoquinone No. 9 (Type 2')
2,6'-bis{4-[5-amino-4-indolylazo]-phenyl}-2',6-dimethyl-diphenoquinone No. 10 (Type 2')
2,6'-bis{4-[5-hydroxy-4-indolylazo]-pheny}-2',6-dimethyl-diphenoquinone No. 11 (Type 2')
2,6'-bis{4-[5-hydroxy-4-inbenzoxazolylazo]-phenyl}-2'-methyl-6-m-tolyl-diphenoquinone No. 12 (Type 2')
2,6'-bis{4-[5-hydroxy-4-benzo(b)thienylazo]-phenyl}-2'-ethyl -6-m-tolyl-diphenoquinone No. 13 (Type 2')
2,6'-bis {4-[1-hydroxy-2-naphthylazo]-pheny}-2',6-dimethyl-diphenoquinone No. 14 (Type 2')
2,6'-bis{4-[1-hydroxy-4-methyl -2-naphthylazo]-phenyl}-2'-chloro-6-phenyl-diphenoquinone No. 15 (Type 2')
2,6'-bis{4-[5-hydroxy-3-methyl -6-isoquinolylazo]-pheny}-2'-methyl-6-phenyl-diphenoquinone No. 16 (Type 2')
2,6'-bis{4-[1-hydroxy-7-ethyl-2-naphthylazo]-phenyl}-2'-cyano-6-phenyl-diphenoquinone No. 17 (Type 2')
2,6'-bis{4-[5-hydroxy-3-methyl -6-isoquinolylazo]-pheny}-2',6-diphenyl-diphenoquinone No. 18 (Type 2')
2,6'-bis{4-[7-carbamoyl-1-hydroxy -2-naphthylazo]-phenyl}-2',6-dimethyl-diphenoquinone No. 19 (Type 2')
2,6'-bis{4-[5-hydroxy-1-methyl-4-pyrazolylazo]-phenyl}-2',6-dimethyl-diphenoquinone No. 20 (Type 2')
2,6'-bis{4-[3-carbamoyl-1-ethyl-5-hydroxy-4-pyrazolylazo]-phenyl}-2',6-dimethyl-diphenoquinone No. 21 (Type 2')
2,6'-bis{4-[3-carboxyl-1-propyl-5-hydroxy-4-pyrazolylazo]-phenyl}-2'-methyl-6-phenyl-diphenoquinone No. 22 (Type 2')
2,6'-bis{4-[3-ethoxycarbonyl-5-hydroxy-1-propyl-4-pyrazolylazo]-phenyl}-2'-naphthyl-6-phenyl-diphenoquinone No. 23 (Type 2')

2,6'-bis{4-[3-amino-1-phenyl-4-pyrazolylazo]-phenyl}-2',6-dimethyl-diphenoquinone No. 24 (Type 2')
2,6'-bis{4-[3-carbamoyl-5-hydroxy -1-phenyl-4pyrazolylazo]-phenyl}-2'-methyl -6-methoxycarbonyl-diphenoquinone No. 25 (Type 2')
2,6'-bis{4-[3-hydroxy-1,8-(N-phenylimido)-4-naphthylazo phenyl}-2',6-dimethyl-diphenoquinone No. 26 (Type 2')
2,6'-bis{4-[4-hydroxy-1,8-(N-phenylimido)-3-naphthylazo]-phenyl}-2',6-dimethyl-diphenoquinone No. 27 (Type 2')
2,6'-bis{4-[4-hydroxy-imidazolperinonazo]-phenyl}-2',6-dimethyl-diphenoquinone No. 28 (Type 2')
2,6'-bis{4-[6-hydroxy-naphthazolperinonazo]-phenyl}-2',6-dinaphthyl-diphenoquinone No. 29 (Type 2')
2,6'-bis{4-[2-hydroxy-3-(phenylcarbamoyl)-1naphthylazo]-phenyl}-2',6-dimethyl-diphenothione No. 30 (Type 2')
2,6'-bis{4-[2-hydroxy-5-methyl -1-phenylazo]-phenyl}-2',6-dimethyl-diphenothione Bis-azo compounds represented by the structural formula (VI)

No. 1 (Type 3)
2,6-bis[2-hydroxy-3-(phenylcarbamoyl)-1-naphthylazo]-2',6'-dimethyl-diphenoquinone No. 2 (Type 3)
2,6-bis[2-hydroxy-3-(N-methylamino)-1-phenylazo]-2'-methoxy-6'-methyl-diphenoquinone No. 3 (Type 3)
2,6-bis[2-hydroxy-3-(N-methylamino)-1-phenylazo]-2' ethyl-6'-methyl-diphenoquinone No. 4 (Type 3)
2,6-bis[2-hydroxy-3-(phenylcarbamoyl)-1-naphthylazo]-2-carboxyl-6'-hydroxymethyl-diphenoquinone No. 5 (Type 3)
2,6-bis[2-sulfamyl-4-(phenylsulfonylamino)-1-phenylazo]-2',6'-dichloro-diphenoquinone No. 6 (Type 3)
2,6-bis[4-(ethylsulfonylamino)-1-phenylazo]-2', 6'-dicyano-diphenoquinone No. 7 (Type 3)
2,6-bis[2-hydroxy-4-amino-1-naphthylazo]-2',6'-dimethyl-diphenoquinone No. 8 (Type 3)
2,6-bis[4-(N,N-dimethylamino)-6-methyl-1-naphtylazo]-2',6'-dimethyl-diphenoquinone No. 9 (Type 3)
2,6-bis[5-amino-4-indolylazo]-2',6'-dimethyldiphenoquinone No. 10 (Type 3)
2,6-bis[5-hydroxy-4-indolylazo]-2',6'-dimethyldiphenoquinone No. 11 (Type 3)
2,6-bis[5-hydroxy-4-isobenzoxazolylazo]-2'-methyl-6'-m-tolyl-diphenoquinone No. 12 (Type 3)
2,6-bis[5-hydroxy-4-benzo(b)thienylazo]-2'-ethyl-6'-m-tolyl-diphenoquinone No. 13 (Type 3)
2,6-bis[1-hydroxy-2-naphthylazo ]-2',6'-dimethyldiphenoquinone No. 14 (Type 3)
2,6-bis[1-hydroxy-4-methyl-2-naphthylazo]-2'-chloro-6'-phenyl-diphenoquinone No. 15 (Type 3)
2,6-bis[5-hydroxy-3-methyl-6-isoquinolylazo]-2'-methyl-6'-phenyl-diphenoquinone No. 16 (Type 3)
2,6-bis[1-hydroxy-7-ethyl-2-naphthylazo]-2'-cyano-6'-phenyl-diphenoquinone No. 17 (Type 3)
2,6-bis[5-hydroxy-3-methyl-6-isoquinolylazo]-2',6'-diphenyl-diphenoquinone No. 18 (Type 3)
2,6-bis[7-carbamoyl-1-hydroxy-2-naphthylazo]-2',6'-dimethyl-diphenoquinone No. 19 (Type 3)
2,6-bis[5-hydroxy-1-methyl-4-pyrazolylazo]-2',6'-dimethyl-diphenoquinone No. 20 (Type 3)
2,6-bis[3-carbamoyl-1-ethyl-5-hydroxy-4-pyrazolylazo]-2',6'-dimethyl-diphenoquinone No. 21 (Type 3)
2,6-bis 3-carboxyl-1-propyl-5-hydroxy-4-pyrazolylazo -2'-methyl-6'-phenyl-diphenoquinone No. 22 (Type 3)
2.6-bis[3-ethoxycarbonyl-5-hydroxy-1-propyl -4pyrazolylazo]-2'-phenyl-6'-naphthyl-diphenoquinone No. 23 (Type 3)
2,6-bis[3-amino-1-phenyl-4-pyrazolylazo]-2',6'-dimethyl-diphenoquinone No. 24 (Type 3)
2,6-bis[3-carbamoyl-5-hydroxy-1-phenyl-4-pyrazolylazo]-2'-methyl-6'-methoxycarbonyl-diphenoquinone No. 25 (Type 3)
2,6-bis[3-hydroxy-1,8-(N-phenylimido)-4-naphthylazo]-2',6'-dimethyl-diphenoquinone No. 26 (Type 3)
2,6-bis[4-hydroxy-1,8-(N-phenylimido)-3-naphthylazo]-2',6'-dimethyl-diphenoquinone No. 27 (Type 3)
2,6-bis[4-hydroxy-imidazolperinonazo]-2',6'-dimethyldiphenoquinone No. 28 (Type 3)
2,6-bis [6-hydroxy-naphthazolperinonazo]-2',6' -dinaphthyl-diphenoquinone No. 29 (Type 3)
2,6-bis[6-hydroxy-3-(phenylcarbamoyl)-1-naphthylazo]-2',6'-dimethyl-diphenoquinone No. 30 (Type 3)
2,6-bis[2-hydroxy-5-methyl-1-phenylazo]-2',6'-dimethyl-diphenoquinone Bis-azo compounds represented by the structural formula (VII)

No. 1 (Type 3')
2,6-bis{4-[2-hydroxy-3-(phenylcarbamoyl) -1-naphthylazo]-phenyl}-2',6'-dimethyl-diphenoquinone No. 2 (Type 3')
2,6-bis{4-[2-hydroxy-3-(N-methylamino) -1-phenylazo]phenyl}-2'-methoxy-6'-methyl-diphenoquinone No. 3 (Type 3')
2,6-bis{4-[2-hydroxy-3-(N-methylamino) -1-phenylazo]phenyl}-2'-ethyl-6'-methyl-diphenoquinone No. 4 (Type 3')

2,6-bis{4-[2-hydroxy-3-(phenylcarbamoyl) -1-naphthylazo]-phenyl}-2'-carboxyl-6'Z-hydroxymethyl-diphenoquinone No. 5 (Type 3')
2,6-bis{4-[2-sulfamyl-4-(phenylsulfonylamino) -1phenylazo]-phenyl}-2',6'-dichloro-diphenoquinone No. 6 (Type 3')
2,6-bis{4-[4-(ethylsulfonylamino) -1-phenylazo]-phenyl}-2',6'-dicyano-diphenoquinone No. 7 (Type 3')
2,6-bis{4-[2-hydroxy-4-amino-1-naphthylazo]-phenyl}-2',6'-dimethyl-diphenoquinone No. 8 (Type 3')
2,6-bis{4-[4-(N,N-dimethylamino)-6-methyl-1-naphthylazo]-phenyl}-2',6'-dimethyl-diphenoquinone No. 9 (Type 3')
2,6-bis{4-[5-amino-4-indolylazo]-phenyl}-2',6'-dimethyl-diphenoquinone No. 10 (Type 3')
2,6-bis{4-[5-hydroxy-4-indolylazo]-phenyl}-2',6'-dimethyl-diphenoquinone No. 11 (Type 3')
2,6-bis{4-[5-hydroxy-4-inbenzoxazolylazo]-phenyl}-2'methyl-6'-m-tolyl-diphenoquinone No. 12 (Type 3')
2,6-bis{4-[5-hydroxy-4-benzo(b)thienylazo]-phenyl}-2'-ethyl-6'-m-tolyl-diphenoquinone No. 13 (Type 3')
2,6-bis{4-[1-hydroxy-2-naphthylazo]-4-phenyl}-2',6'-dimethyl-diphenoquinone No. 14 (Type 3')
2,6-bis{4-[1-hydroxy-4-methyl-2-naphthylazo]-phenyl} -2'-chloro-6'-phenyl-diphenoquinone No. 15 (Type 3')
2,6-bis{4-[5-hydroxy-3-methyl-6-isoquinolylazo]-phenyl}-2'-methyl-6'-phenyl-diphenoquinone No. 16 (Type 3')
2,6-bis{4-[1-hydroxy-7-ethyl-2-naphthylazo]-phenyl}-2'-cyano-6'-phenyl-diphenoquinone No. 17 (Type 3')
2,6-bis {4-[5-hydroxy-3-methyl -6-isoquinolylazo]-phenyl}-2',6'-diphenyl-diphenoquinone No. 18 (Type 3')
2,6-bis{4-[7-carbamoyl-1-hydroxy-2-naphthylazo]-phenyl}-2',6'-dimethyl-diphenoquinone No. 19 (Type 3')
2,6-bis{4-[5-hydroxy-1-methyl-4-pyrazolylazo]-phenyl}-2',6'-dimethyl-diphenoquinone No. 20 (Type 3')
2,6-bis{4-[3-carbamoyl-1-ethyl-5-hydroxy-4-pyrazolylazo]-phenyl}-2',6'-dimethyl-diphenoquinone No. 21 (Type 3')
2,6-bis{4-[3-carboxyl-1-propyl-5-hydroxy-4-pyrazolylazo]-phenyl}-2'-methyl-6'-phenyl-diphenoquinone No. 22 (Type 3')
2,6-bis {4-[3-ethoxycarbonyl-5-hydroxy-1-propyl-4-pyrazolylazo]-phenyl}-2',6'-dimethyl-diphenoquinone No. 23 (Type 3')
2,6-bis{4-[3-amino-1-phenyl-4-pyrazolylazo]-phenyl}-2',6'-dimethyl-diphenoquinone No. 24 (Type 3')
2,6-bis{4-[3-carbamoyl-5-hydroxy-1-phenyl-4pyrazolylazo]-phenyl}-2'-methyl-6'-methoxycarbonyl-diphenoquinone No. 25 (Type 3')
2,6-bis {4-[3-hydroxy-1,8-(N-phenylimido) -4-naphthylazo]-phenyl}-2',6'-dimethyl-diphenoquinone No. 26 (Type 3')
2,6-bis{4-[4-hydroxy-1,8-(N-phenylimido) -3-naphthylazo]-phenyl}-2',6'-dimethyl-diphenoquinone No. 27 (Type 3')
2,6-bis{4-[4-hydroxy-imidazolperinonazo]-phenyl}-2',6'-dimethyl-diphenoquinone No. 28 (Type 3')
2,6-bis {4-[6-hydroxy-naphthazolperinonazo]-phenyl}-2',6'-dinaphthyl-diphenoquinone No. 29 (Type 3')
2,6-bis -[2-hydroxy-3-(phenylcarbamoyl)-1-naphthylazo]-phenyl}-2',6'-dimethyl-diphenothione No. 30 (Type 3')
2,6-bis{4-[2-hydroxy-5-methyl-1-phenylazo]-phenyl }-2',6'-dimethyl-diphenothione Any of the bis-azo compounds above described exhibits a desirable carrier generating function and a desirable electron transporting function and is practically usable. Among these bis-azo compounds, the bis-azo compounds represented by the structural formulas (III), (V) and (VII) are particularly desirable since they excel in the electron transporting function.

In view of the plane property (that is, the carrier generating function and the electron transporting function), the bis-azo compounds of Nos. 1, 10, 19, 25, 26, 27, 28 and 29 with respect to each of the structural formulas (II) to (VII) are desirable.

Any of the bis-azo compounds according to the present invention may be produced by a conventional synthetic process. Particularly, it may be obtained by synthesizing a predetermined diphenoquinone, converting the resultant diphenoquinone into a diamino-compound, converting the resultant diamino-compound into a tetrazo-compound, and introducing a coupler residue into the resultant tetrazocompound.

In the following, explanation will be made of each of the synthesizing steps.

Synthesis of a diphenoquinone

In order to obtain the diphenoquinone, there can be employed, for example, the synthetic process described in Menger et al., J. Org. Chem., 50, pp. 3927-3928 (1985).

Predetermined phenol derivatives (that is; phenol derivative (i-1) and phenol derivative (i-2) in the following reaction 1, and phenol derivative (ii-1) and phenol derivative (ii-2) in the following reaction 2) are dissolved in an organic solvent, to which an oxidant is added, followed by subjecting to reflux at a temperature of 50° to 60° C. for five hours while stirring the reaction system to cause oxidation coupling among the reactants, whereby obtaining a diphenoquinone derivative.

Specific examples of the organic solvent in this case are chloroform, methanol, acetonitrile, dimethylacetamide, acetic acid, etc. Likewise, specific examples of the oxidant are potassium permanganate, copper chloride, etc.

In the case of the reaction 1, there are obtained two kinds of isomers (i-3) and (i-4) as the diphenoquinone. Therefore, these isomers are separated one from the other by means of chromatography to obtain a diphenoquinone having a predetermined chemical structure.

In the case of reaction 2, there are formed, other than diphenoquinone (ii-3), by-products such as compounds (ii-4) and (ii-5). Therefore, as well as in the case of the reaction 1, the resultant reaction product is subjected to separation by means of chromatography to obtain a desired diphenoquinone (ii-3).

tively used diphenoquinone (iii-3), (iii-4) or (iv-3) which are obtained in the following reaction 3 or 4.

Reaction 1

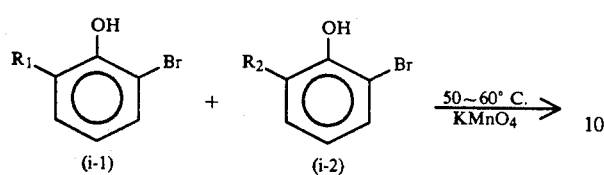

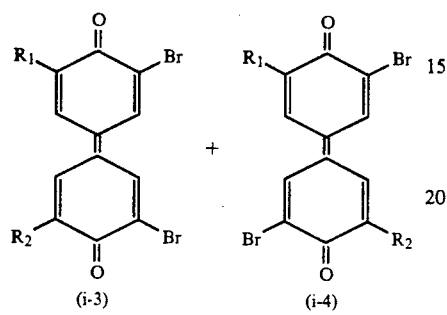

Reaction 2

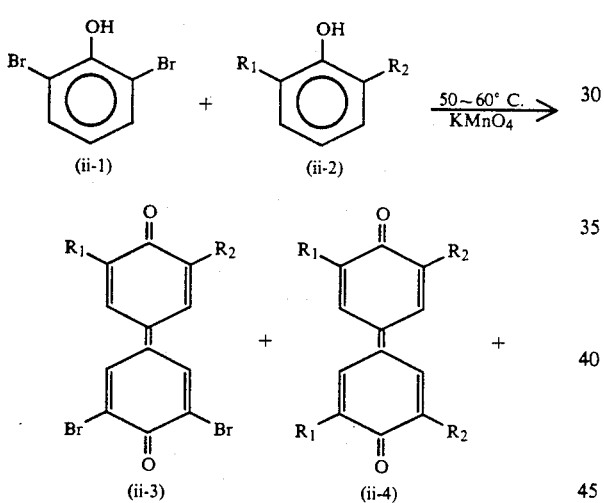

Reaction 3

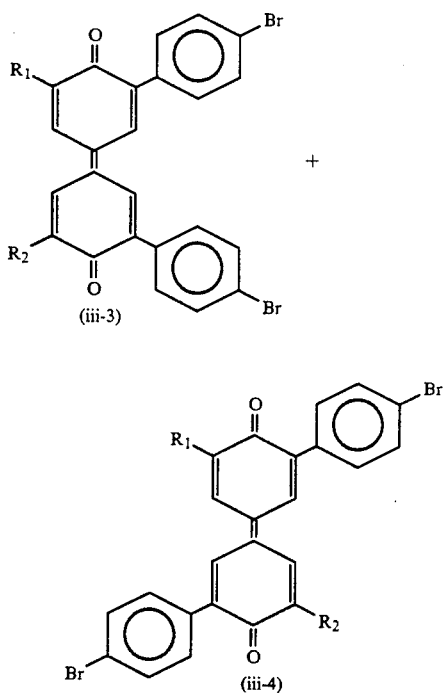

Reaction 4

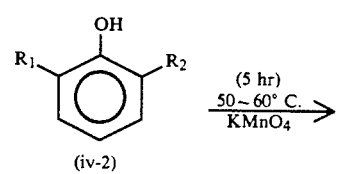

The diphenoquinones (i-3), (i-4) and (ii-3) thus obtained in the above reaction 1 or 2 are used respectively as the starting compound for obtaining the bis-azo compound represented by the structural formula (II), (IV) or (VI).

As the starting compound in the case of obtaining the bis-azo compound having a phenyl group at the diphenoquinone skeleton thereof (represented by the structural formula (III), (V) or (VII)), there is selec-

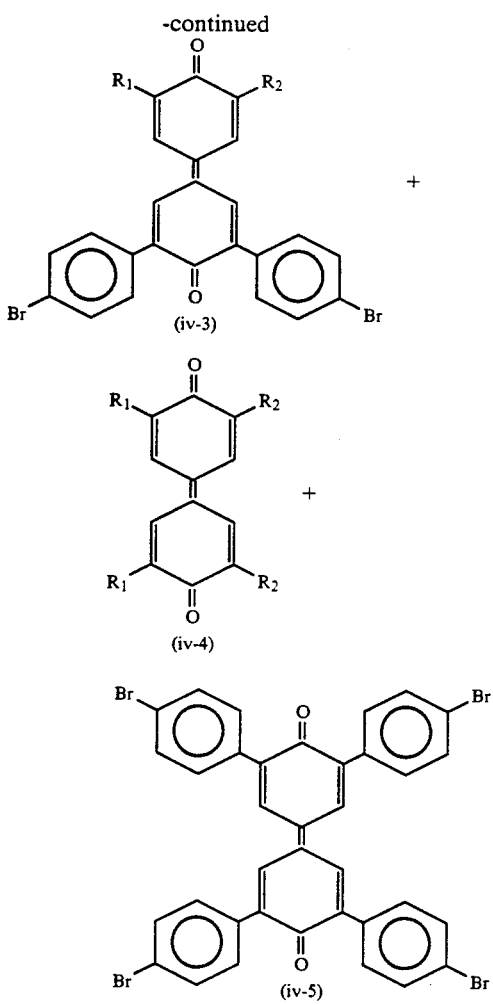

Further, in the case of obtaining the bis-azo compound represented by the structural formula (I) wherein the substituent group is not oxygen atom but sulfur atom, there is used, for example, 2-bromo-6-substituted thiol represented by the following formula as the starting compound for the reaction, desired dithiophene is synthesized under the conditions similar to those in the foregoing reaction, and the resultant is used as the starting compound.

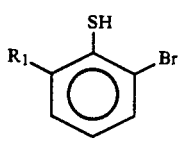

Diamination

The diphenoquinone derivative or the diphenothion derivative obtained in the above is reacted with sodium amide in aqueous ammonia while stirring the reaction system and while being refluxed at a temperature of 60° to 70° C. for a predetermined period of time to obtain desired diaminated diphenoquinone drivative or diaminated diphenothion derivative.

Preparation of tetrazo compound

As for each of the diaminated compounds obtained in the above, an acidic solution thereof is prepared, a predetermined amount of sodium nitrite or nitrous acid is dropwise added to the acidic solution while stirring under low temperature condition (usually, −10° to 5° C.), then a predetermined amount of borofluoric acid, hydrogen halogenide, or sulfuric acid is added to cause reaction, whereby desired tetrazonium salt compound is obtained.

Coupling

Each of the tetrazonium salt compounds obtained in the above is dissolved in an organic solvent such as N,N-dimethylformamide, dimethyl sulfoxide, or the like, to which a predetermined amount of a desired coupler is added, to thereby obtain desired bis-azo compound as the final product.

SYNTHESIS EXAMPLES

In the following, some examples of synthesizing the bis-azo compound according to the present invention will be described.

Confirmation of the chemical structure of each of the bis-azo compounds obtained in the following synthesis examples was carried out in the following manner.

That is, a specimen of the product obtained is subjected to infrared-absorbing analysis by KBr tablet method to thereby examine the infrared absorption with respect to the diphenoquinone skeleton and the infrared absorption with respect to the substituent group introduced by way of the coupling. Particularly, since the position where the azo group is introduced is decided in accordance with the position of the reactive substituent group introduced into the diphenoquinone as the starting compound, whether or not desired substituent group has been introduced as expected is confirmed by examining the infrared absorption with respect to the specific intermolecular bond in the diphenoquinone skeleton and the infrared absorption with respect to the specific intermolecular bond of the coupling residue introduced by way of the coupling.

Then, another specimen of the product is subjected to elemental analysis. The resultant value is compared with the calculated theoretical value. Based on the compared result, the constituent element ratio of the bis-azo compound is determined.

Synthesis Example 1 (Compound No. 1 of the structural formula (VI))

5.57 g (0.023 mole) of diamine compound having the following chemical structure (A) was added to 75 ml of 10% hydrochloric acid while stirring in a ice-water bath and maintaining the temperature of the solution at −1° C.

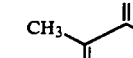

Then, a solution obtained by dissolving 354 g (0.051 mole) of sodium nitrite in 10 ml of water was dropwise added to the resultant obtained in the above while maintaining the temperature of said solution at a temperature of −2° to 1° C. over a period of 30 minutes, followed by stirring for an hour, and the resultant was allowed to stand while cooling. 20 ml of 42% borofluoric acid was added to form a crystalline precipitate. The crystalline precipitate was washed with ethanol, followed by drying, to thereby obtain 7.61 g of tetrazoniumdifluoroborate (yield : 70.4%)

To 0.88 g (0.002 mole) of the tetrazoniumfluoroborate, a solution obtained by dissolving 1.06 g (0.004 mole) of a coupler having the following chemical structure (B) in 100 ml of N,N-dimethylformamide and adding, to the resultant, a solution obtained by dissolving 0.35 g (0.0043 mole) of sodium acetate in 5 ml of water was dropwise added over a period of 5 minutes while maintaining the reaction system at a temperature of 17° to 21° C.

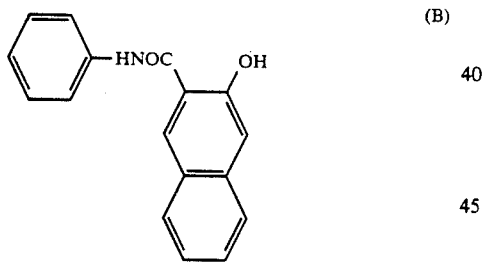
(B)

Then, the reaction system was stirred for 3 hours to form a precipitate, which was filtrated and washed with 200 ml of N,N-dimethylformamide five times. The resultant was then washed with water two times, followed by subjecting to drying under reduced pressure, to thereby obtain 1.27 g of a bluish product (yield : 80.3%).

As for the product, its IR spectrum was observed by using FT-IR produced by JEOL, Ltd (trademark name : JIR 5000). As a result, there were observed a peak belonging to the diphenoquinone skeleton at 1615 $cm^{-1}$ and another peak belonging to the coupler residue at 1675 $cm^{-1}$.

Further, a specimen of the product was subjected to elemental analysis. As a result, there were obtained the following results.

The element analyzed values : as $C_{48}H_{34}O_6N_6$
the calculated values (%)
C : 72.90, H : 4.33, N : 10.63
the measured values (%)
C : 73.02, H : 4.41, N : 10.47

From these results, it was confirmed that the product is a compound having the following chemical structure (that is, the compound No. 1 represented by the structural formula (VI)).

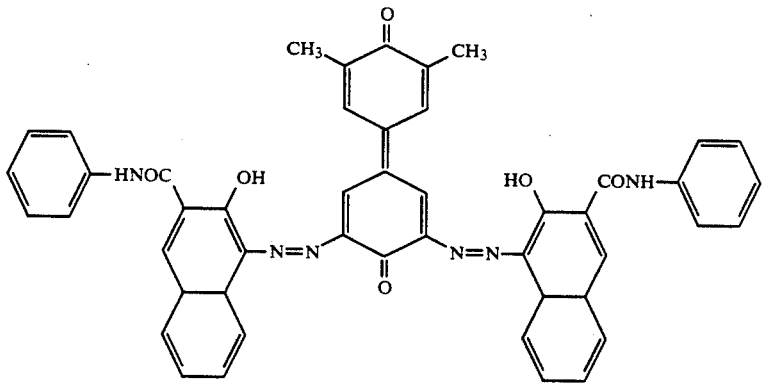

Synthesis Example 2 (the compound No. 1)

The procedures of Synthesis Example 1 were repeated, except that the diamine compound having the foregoing chemical structure (A) was replaced by diamine compound having the following chemical structure (A 2), to thereby obtain a bluish product.

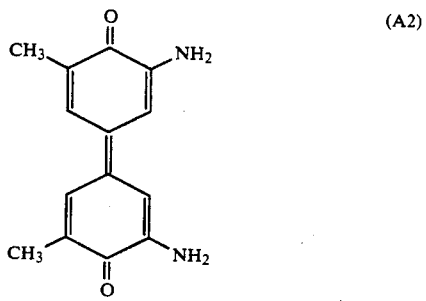
(A2)

As for the product obtained, its IR spectrum was observed in the same manner as in Synthesis Example 1. As a result, there were observed a peak belonging to the diphenoquinone skeleton at 1610 $cm^{-1}$ and a peak belonging to the coupler residue at 1675 $cm^{-1}$.

Further, the product was subjected to elemental analysis. The analyzed results were as follows.

The element analyzed values : as $C_{48}H_{34}O_6N_6$
the calculated values (%)
C : 72.90, H : 4.33, N : 10.63
the measured values (%)
C : 72.73, H : 4.56, N : 10.74

Synthesis Example 3 (the compound No. 1 of the structural formula (II))

The procedures of Synthesis Example 1 were repeated, except that diamine compound having the following chemical structure (A 3) was used instead of the diamine compound having the following chemical structure (A), to thereby obtain a bluish product.

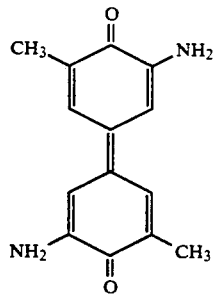

(A3)

As for the product obtained, its IR spectrum was observed in the same manner as in Synthesis Example 1. As a result, there were observed a peak belonging to the diphenoquinone skeleton at 1610 cm$^{-1}$ and a peak belonging to the coupler residue at 1675 cm$^{-1}$.

Further, the product was subjected to elemental analysis. The analyzed results were as follows.

The element analyzed values : as $C_{47}H_{37}N_6O_6$
the calculated values (%)
C : 72.90, H : 4.33, N : 10.63
the measured values (%)
C : 73.08, H : 4.17, N : 10.80

Synthesis Example 4 (the compound No. 4 of the structural formula (VI))

The procedures of Synthesis Example 1 were repeated, except that p-cresol was used as the coupler, to thereby obtain a bluish product.

As for the product obtained, its IR spectrum was observed in the same manner as in Synthesis Example 1. As a result, there were observed a peak belonging to the diphenoquinone skeleton at 1605 cm$^{-1}$ and a peak belonging to the coupler residue at 3580 cm$^{-1}$.

Further, the product was subjected to elemental analysis. The analyzed results were as follows.

The element analyzed values : as $C_{28}H_{24}N_4O_4$
the calculated values (%)
C : 69.99, H : 5.03, N : 11.66
the measured values (%)
C : 70.12, H : 4.91, N : 11.78

Synthesis Example 5 (the compound No. 10 of the structural formula (VI))

The procedures of Synthesis Example 1 were repeated, except that 4-hydroxyindoline was used as the coupler, to thereby obtain a bluish product.

As for the product obtained, its IR spectrum was observed in the same manner as in Synthesis Example 1. As a result, there were observed a peak belonging to the diphenoquinone skeleton at 1610 cm$^{-1}$ and a peak belonging to the coupler residue at 3400 cm$^{-1}$.

Further, the product was subjected to elemental analysis. The analyzed results were as follows.

The element analyzed values : as $C_{30}H_{26}N_6O_4$
the calculated values (%)
C : 67.40, H : 4.90, N : 15.72
the measured values (%)
C : 67.63, H : 4.76, N : 15.84

Synthesis Example 6 (the compound No. 3 of the structural formula (VI))

The procedures of Synthesis Example 1 were repeated, except that N-methylaniline was used as the coupler, to thereby obtain a bluish product.

As for the product obtained, its IR spectrum was observed in the same manner as in Synthesis Example 1. As a result, there were observed a peak belonging to the diphenoquinone skeleton at 1605 cm$^{-1}$ and a peak belonging to the coupler residue at 3500 cm$^{-1}$.

Further, the product was subjected to elemental analysis. The analyzed results were as follows.

The element analyzed values : as $C_{28}H_{26}N_6O_2$
the calculated values (%)
C : 70.28, H : 5.48, N : 17.56
the measured values (%)
C : 70.37, H : 5.29, N : 17.63

Synthesis Example 7 (the compound No. 19 of the structural formula (VI))

The procedures of Synthesis Example 1 were repeated, except that 1-methyl-5-hydroxypyrazole was used as the coupler, to thereby obtain a bluish product.

As for the product obtained, its IR spectrum was observed in the same manner as in Synthesis Example 1. As a result, there were observed a peak belonging to the diphenoquinone skeleton at 1615 cm$^{-1}$ and a peak belonging to the coupler residue at 1470 cm$^{-1}$.

Further, the product was subjected to elemental analysis. The analyzed results were as follows.

The element analyzed values : as $C_{22}H_{20}N_8O_4$
the calculated values (%)
C : 57.39, H : 4.38, N : 24.33
the measured values (%)
C : 57.47, H : 4.50, N : 24.12

Synthesis Example 8 (the compound No. 25 of the structural formula (VI))

The procedures of Synthesis Example 1 were repeated, except that a compound having the following chemical structure (B 1) was used as the coupler, to thereby obtain a bluish product.

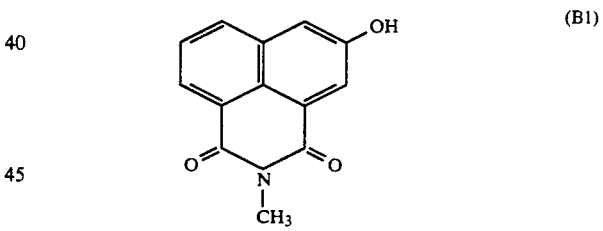

(B1)

As for the product obtained, its IR spectrum was observed in the same manner as in Synthesis Example 1. As a result, there were observed a peak belonging to the diphenoquinone skeleton at 1615 cm$^{-1}$ and a peak belonging to the coupler residue at 1710 cm$^{-1}$.

Further, the product was subjected to elemental analysis. The analyzed results were as follows.

The element analyzed values : as $C_{40}H_{26}N_6O_8$
the calculated values (%)
C : 66.97, H : 3.65, N : 11.69
the measured values (%)
C : 66.97, H : 3.51, N : 11.75

Synthesis Example 9 (the compound No. 27 of the structural formula (VI))

The procedures of Synthesis Example 1 were repeated, except that a compound having the following chemical structure (B 2) was used as the coupler, to thereby obtain a bluish product.

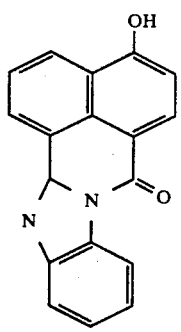
(B2)

As for the product obtained, its IR spectrum was observed in the same manner as in Synthesis Example 1. As a result, there were observed a peak belonging to the diphenoquinone skeleton at 1620 cm$^{-1}$ and a peak belonging to the coupler residue at 1700 cm$^{-1}$.

Further, the product was subjected to elemental analysis. The analyzed results were as follows.

The element analyzed values : as $C_{50}H_{28}N_6O_6$
the calculated values (%)
C : 74.25, H : 3.49, N : 10.39
the measured values (%)
C 74.41, H : 3.63, N : 10.14

Synthesis Example 10 (the compound No. 4 of the structural formula (VI))

The procedures of Synthesis Example 3 were repeated, except that p-cresol was used as the coupler, to thereby obtain a bluish product.

As for the product obtained, its IR spectrum was observed in the same manner as in Synthesis Example 1. As a result, there were observed a peak belonging to the diphenoquinone skeleton at 1605 cm$^{-1}$ and a peak belonging to the coupler residue at 3600 cm$^{-1}$.

Further, the product was subjected to elemental analysis. The analyzed results were as follows.

The element analyzed values : as $C_{28}H_{24}N_4O_4$
the calculated values (%)
C : 69.99, H : 5.03, N : 11.66
the measured values (%)
C : 69.73, H : 5.25, N : 11.72

Synthesis Example 11 (the compound No. 10 of the structural formula (VI))

The procedures of Synthesis Example 3 were repeated, except that 4-hydroxyindoline was used as the coupler, to thereby obtain a bluish product.

As for the product obtained, its IR spectrum was observed in the same manner as in Synthesis Example 1. As a result, there were observed a peak belonging to the diphenoquinone skeleton at 1610 cm$^{-1}$ and a peak belonging to the coupler residue at 3450 cm$^{-1}$.

Further, the product was subjected to elemental analysis. The analyzed results were as follows.

The element analyzed values : as $C_{30}H_{26}N_6O_4$
the calculated values (%)
C : 67.40, H : 4.90, N : 15.72
the measured values (%)
C : 67.59, H : 4.74, N : 15.86

Synthesis Example 12 (the compound No. 3 of the structural formula (II))

The procedures of Synthesis Example 4 were repeated, except that N-methylaniline was used as the coupler, to thereby obtain a bluish product.

As for the product obtained, its IR spectrum was observed in the same manner as in Synthesis Example 1. As a result, there were observed a peak belonging to the diphenoquinone skeleton at 1605 cm$^{-1}$ and a peak belonging to the coupler residue at 3500 cm$^{-1}$.

Further, the product was subjected to elemental analysis. The analyzed results were as follows.

The element analyzed values : as $C_{28}H_{26}N_6O_2$
the calculated values (%)
C : 70.28, H : 5.48, N : 17.56
the measured values (%)
C : 70.41, H : 5.26, N : 17.65

Synthesis Example 13 (the compound No. 19 of the structural formula (VI))

The procedures of Synthesis Example 3 were repeated, except that 1-methyl-5-hydroxypyrazole was used as the coupler, to thereby obtain a bluish product.

As for the product obtained, its IR spectrum was observed in the same manner as in Synthesis Example 1. As a result, there were observed a peak belonging to the diphenoquinone skeleton at 1620 cm$^{-1}$ and a peak belonging to the coupler residue at 1480 cm$^{-1}$.

Further, the product was subjected to elemental analysis. The analyzed results were as follows.

The element analyzed values : as $C_{22}H_{20}N_8O_4$
the calculated values (%)
C : 57.39, H : 4.38, N : 24.33
the measured values (%)
C : 57.49, H : 4.53, N : 24.10

Synthesis Example 14 (the compound No. 29 of the structural formula (VI))

The procedures of Synthesis Example 1 were repeated, except that a compound having the following chemical structure (C) was used instead of the compound having the foregoing chemical structure (A), to thereby obtain a bluish product.

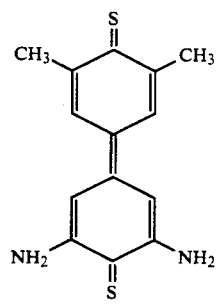
(C)

As for the product obtained, its IR spectrum was observed in the same manner as in Synthesis Example 1. As a result, there were observed a peak belonging to the diphenoquinone skeleton at 1520 cm$^{-1}$ and a peak belonging to the coupler residue at 1675 cm$^{-1}$.

Further, the product was subjected to elemental analysis. The analyzed results were as follows.

The element analyzed values : as $C_{47}H_{37}N_6O_4S_2$
the calculated values (%)
C : 69.35, H : 4.58, N : 10.32
the measured values (%)
C : 69.55, H : 4.41, N : 10.48

Synthesis Example 15 (Compound No. 1 of the structural formula (VII))

9.07 g (0.023 mole) of diamine compound having the following chemical structure (D) was added to 75 ml of 10% hydrochloric acid while stirring in a ice-water bath and maintaining the temperature of the solution at $-1°$ C.

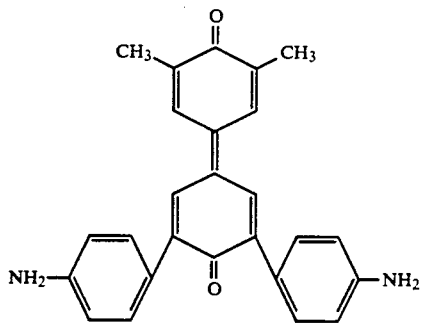

(D)

Then, a solution obtained by dissolving 354 g (0.051 mole) of sodium nitrite in 10 ml of water was dropwise added to the resultant obtained in the above while maintaining the temperature of said solution at a temperature of −2° to 1° C. over a period of 30 minutes, followed by stirring for an hour, and the resultant was allowed to stand while cooling. 20 ml of 42% borofluoric acid was added to form a crystalline precipitate. The crystalline precipitate was filtrated and washed with ethanol, followed by drying, to thereby obtain 10.19 g of tetrazoniumdifluoroborate (yield : 74.8%)

To 1.18 g (0.002 mole) of the tetrazoniumfluoroborate, a solution obtained by dissolving 1.06 g (0.004 mole) of a coupler having the following chemical structure (E) in 100 ml of N,N-dimethylformamide and adding, to the resultant, a solution obtained by dissolving 0.35 g (0.0043 mole) of sodium acetate in 5 ml of water was dropwise added over a period of 5 minutes while maintaining the reaction system at a temperature of 17° to 21° C.

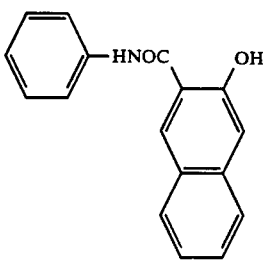

(E)

Then, the reaction system was stirred for 3 hours to form a precipitate, which was filtrated and washed with 200 ml of N,N-dimethylformamide five times. The resultant was then washed with water two times, followed by subjecting to drying under reduced pressure, to thereby obtain 1.48 g of a bluish product (yield : 78.5%).

As for the product, its IR spectrum was observed in the same manner as in Synthesis Example 1. As a result, there were observed a peak belonging to the diphenoquinone skeleton at 1610 cm$^{-1}$ and a peak belonging to the coupler residue at 1670 cm$^{-1}$.

Further, the product was subjected to elemental analysis. As a result, there were obtained the following results.

The element analyzed vlaues : as $C_{58}H_{39}N_6O_6$
the calculated values (%)
C : 76.42, H: 4.49, N : 8.91
the measured values (%)
C : 76.53, H : 4.58, N : 8.82

From these results, it was confirmed that the product is a compound having the following chemical structure (F).

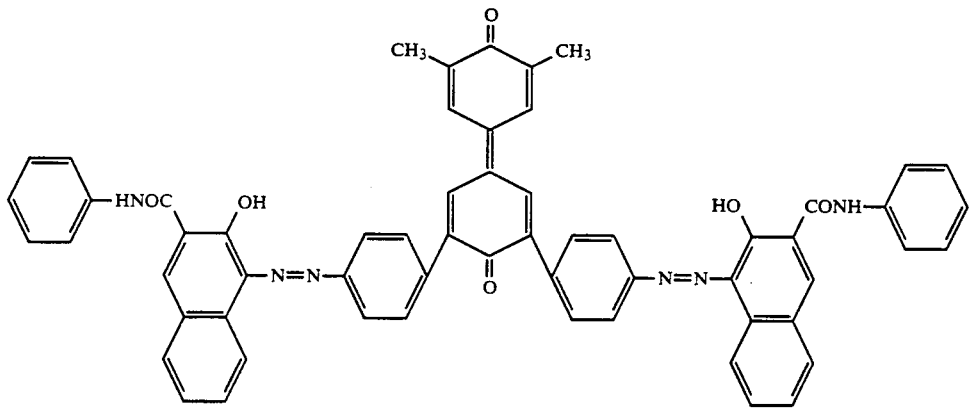

Synthesis Example 16 (the compound No. 4 of the structural formula (VII))

The procedures of Synthesis Example 15 were repeated, except that p-cresol was used as the coupler, to thereby obtain a bluish product.

As for the product obtained, its IR spectrum was observed in the same manner as in Synthesis Example 1. As a result, there were observed a peak belonging to the diphenoquinone skeleton at 1600 c$^{-1}$ and a peak belonging to the coupler residue at 3600 cm$^{-1}$.

Further, the product was subjected to elemental analysis. The analyzed results were as follows.

The element analyzed values : as $C_{40}H_{32}N_4O_4$
the calculated values (%)
C : 75.93, H : 5.10, N : 8.86
the measured values (%)
C : 76.06, H : 4.97, N : 8.94

Synthesis Example 17 (the compound No. 10 of the structural formula (VII))

The procedures of Synthesis Example 15 were repeated, except that 4-hydroxyindoline was used as the coupler, to thereby obtain a bluish product.

As for the product obtained, its IR spectrum was observed in the same manner as in Synthesis Example 1. As a result, there were observed a peak belonging to the diphenoquinone skeleton at 1610 cm$^{-1}$ and a peak belonging to the coupler residue at 3500 cm$^{-1}$.

Further, the product was subjected to elemental analysis. The analyzed results were as follows.

The element analyzed values : as $C_{42}H_{32}N_6O_4$

Synthesis Example 18 (the compound No. 3 of the structural formula (VII))

The procedures of Synthesis Example 15 were repeated, except that N-methylaniline was used as the coupler, to thereby obtain a bluish product.

As for the product obtained, its IR spectrum was observed in the same manner as in Synthesis Example 1. As a result, there were observed a peak belonging to the diphenoquinone skeleton at 1605 cm$^{-1}$ and a peak belonging to the coupler residue at 3550 cm$^{-1}$.

Further, the product was subjected to elemental analysis. The analyzed results were as follows.

The element analyzed values : as $C_{40}H_{34}N_6O_2$
the calculated values (%)
C : 77.40, H : 5.52, N : 13.54
the measured values (%)
C : 77.66, H : 5.42, N : 13.75

Synthesis Example 19 (the compound No. 19 of the structural formula (VII))

The procedures of Synthesis Example 15 were repeated, except that 1-methyl-5-hydroxypyrazole was used as the coupler, to thereby obtain a bluish product.

As for the product obtained, its IR spectrum was observed in the same manner as in Synthesis Example 1. As a result, there were observed a peak belonging to the diphenoquinone skeleton at 1615 cm$^{-1}$ and a peak belonging to the coupler residue at 1480 cm$^{-1}$.

Further, the product was subjected to elemental analysis. The analyzed results were as follows.

The element analyzed values : as $C_{34}H_{28}N_8O_4$
the calculated values (%)
C : 66.66, H : 4.61, N : 18.29
the measured values (%)
C : 66.80, H : 4.49, N : 18.38

Synthesis Example 20 (the compound No. 25 of the structural formula (VII))

The procedures of Synthesis Example 15 were repeated, except that a compound having the following chemical structure (E 1) was used as the coupler, to thereby obtain a bluish product.

(E1)

As for the product obtained, its IR spectrum was observed in the same manner as in Synthesis Example 1. As a result, there were observed a peak belonging to the diphenoquinone skeleton at 1615 cm$^{-1}$ and a peak belonging to the coupler residue at 1700 cm$^{-1}$.

Further, the product was subjected to elemental analysis. The analyzed results were as follows.

The element analyzed values : as $C_{52}H_{34}N_6O_8$
the calculated values (%)
C 71 72, H : 3.94, N : 9.65
the measured values (%)
C : 71.96, H : 4.08, N : 9.41

Synthesis Example 21 (the compound No. 27 of the structural formula (VII))

The procedures of Synthesis Example 15 were repeated, except that a compound having the following chemical structure (E 2) was used as the coupler, to thereby obtain a bluish product.

(E2)

As for the product obtained, its IR spectrum was observed in the same manner as in Synthesis Example 1. As a result, there were observed a peak belonging to the diphenoquinone skeleton at 1620 cm$^{-1}$ and a peak belonging to the coupler residue at 1700 cm$^{-1}$.

Further, the product was subjected to elemental analysis. The analyzed results were as follows.

The element analyzed values : as $C_{62}H_{36}N_6O_6$
the calculated values (%)
C : 77.49, H : 3.78, N : 8.74
the measured values (%)
C : 77.63, H : 3.95, N : 8.52

Synthesis Example 22 (the compound No. 29 of the structural formula (VII))

The procedures of Synthesis Example 15 were repeated, except that a compound having the following chemical structure (D 3) was used instead of the compound having the foregoing chemical structure (D), to thereby obtain a bluish product.

(D3)

As for the product obtained, its IR spectrum was observed in the same manner as in Synthesis Example 1. As a result, there were observed a peak belonging to the diphenoquinone skeleton at 1520 cm$^{-1}$ and a peak belonging to the coupler residue at 1670 cm$^{-1}$.

Further, the product was subjected to elemental analysis. The analyzed results were as follows.

The element analyzed values : as $C_{40}H_{32}N_4O_2S_2$
the calculated values (%)
C : 72.26, H : 4.85, N : 8.43
the measured values (%)
C : 72.44, H : 4.62, N : 8.56

USE EXAMPLES

In order to examine the electric property of the bis-azo compound synthesized in the present invention, the charge generating efficiency the bis-azo compound as a pigment was measured by a conventional transit photoconductivity measuring method described in Z. D. Popovic, Journal of Applied Physics, 52, pp. 6197 (1981).

(Preparation of a specimen for measurement)

With reference to FIG. 1, an ITO film is deposited on a transparent polypropylene sheet 101 by evaporation process, to thereby form an electrode layer 102. On the electrode layer 102 is formed a 5 microns thick pigment-resin dispersed layer 103. And, on the pigment-resin dispersed layer 103 is deposited an Au film to form a counter electrode 104. In this way, there is obtained a sandwich type sample for measuring electric conductivity.

In the measurement, there were used those bis-azo compounds synthesized in the present invention and chlorodianblue as a known bis-azo compound for comparison purposes which are shown in the following table.

Each of the samples used was prepared under the following conditions.

Resin : polyester resin (trademark name : VYLON 200, produced by Toyobo Co., Ltd.)—90 wt. %, and pigment : each bis-azo compound—10 wt. %. These materials are uniformly dispersed.

(Measurement)

As shown in FIG. 1, laser was used as a light source for exciting the sample to irradiate pulse beam through the transparent sheet 101. By the irradiation of this pulse beam, the magnitude of a drop of voltage was measured as for the pigment-resin dispersed layer 104 interposed between the ITO electrode 102 and the Au electrode 104. In this measurement, there was measured a displacement magnitude from the equilibrium state by using a bridge circuit shown in FIG. 2.

Explanation will be made of this bridge circuit. That is, a bridge circuit comprising four condensers in total is provided such that a measurement sample is equalized to one of the condensers, and a change in voltage at each of the condensers is measured. In the figure, CS stands for the measurement sample, and C1, C2 and C3 are the remaining condensers. Upon the measurement, switch SW is switched on to apply a predetermined voltage from power source 106 onto nitrogen laser NL, whereby the nitrogen laser NL is actuated to irradiate laser beam to dye laser DL, which emits pulse of visible light to irradiate to the measurement sample CS. There is disposed half mirror HM in the light path between the dye laser DL and the measurement sample CS. Light energy irradiated from the dye laser DL is monitored by monitor 108. The magnitude of a voltage drop occurred at the measurement sample CS upon the light irradiation from the dye laser DL is measured by a storage oscilloscope 107.

There were used the following devices in this measurement:

as the power source,
TR 300 C., produced by Advantest Company;
as the nitrogen gas laser NL,
LN 300, produced by Nippon Laser Company;
as the dye laser DL,
LD2S, produced by Nippon Laser Company;
as the monitor,
Joule Meter, produced by Molectron Company; and
as the storage oscilloscope,
TS8123, produced by Iwatsu Electric Company.

A charge generating efficiency ($\eta$) was obtained from the measured value thus obtained (voltage drop magnitude $\Delta V$) in accordance with the following equation.

$$\eta = (C. \Delta V/eN\phi) \cdot (1/fv.f(\epsilon 1, \epsilon 2))$$

The correction factor $f(\epsilon 1, \epsilon 2)$ can be calculated by following equation.

$$f(\epsilon 1, \epsilon 2) = \epsilon 2/[\epsilon 1 + 2\epsilon 2 - fv \cdot (\epsilon 1 - \epsilon 2)]$$

In the above equations, C is a capacitance of the sample, e is a charge elementary quantity, $N\Omega$ is the number of photons absorbed, $\epsilon 1$ is a dielectric constant of the pigment, fv is the volume fraction of the pigment, and $\epsilon 2$ is a dielectric constant of the resin.

These factors in the equations were made as follows. The dielectric constant of the bis-azo pigment : $\epsilon 1 = 4.45$ in all the cases because of slight structural difference; the dielectric constant of the polyester resin : $\epsilon 2 = 2.60$; the volume fraction of the pigment : 7.25 when the content of the pigment is 10 wt. %; the dielectric constant of the sample : 2.71, and the capacitance C at this time : $C = 4.8 \times 10^{-10}$; the number of incident photons : $N\phi = 5 \times 10^{-10}$; and the field intensity between the two electrode : $3 \times 10^7$ V/m.

Under this situation, the measured value $\Delta V$ and the charge generating efficiency $\eta$ as for each sample were as shown in the following table.

TABLE

| Sample | ($\Delta V$) | charge generating efficiency (%) |
|---|---|---|
| Comparison (chlorodian blue) | 267 mV | 1.5 |
| Synthesis Example 15 | 1510 | 8.5 |
| Synthesis Example 5 | 675 | 3.8 |
| Synthesis Example 7 | 747 | 4.2 |
| Synthesis Example 12 | 516 | 2.9 |
| Synthesis Example 21 | 1370 | 7.7 |
| Synthesis Example 22 | 1476 | 8.3 |
| Synthesis Example 20 | 1156 | 6.5 |

Organic electrophotographic photosensitive members to be provided according to the present invention.

The electrophotographic photosensitive member according to the present invention basically comprises a conductive substrate and a light receiving layer disposed on said conductive substrate, said light receiving layer containing the foregoing bis-azo compound. The term "light receiving layer" is a general term to include all the layers to be disposed on the conductive substrate.

The light receiving layer can be of a single layer structure or a multilayered structure comprising a plurality of functionally divided layers being stacked.

In the case where the light receiving layer is of a single layer structure, the electrophotographic photosensitive member takes such a configuration as shown in FIG. 3, which comprises a conductive substrate 201 and a photosensitive layer 202 disposed on said conductive substrate, said photosensitive layer containing the bis-azo compound of the present invention as a charge generating material together with a charge transporting material in a binder resin.

In the case where the light receiving layer is of a functionally divided multilayered structure, the electrophotographic photosensitive member takes such a configuration as shown in FIG. 4, which comprises a conductive substrate; a charge generating layer 203 disposed on said conductive substrate, said charge generating layer being formed by evaporating the bis-azo compound of the present invention as a charge generating material on said conductive substrate or by applying a composition comprising the bis-azo compound of the present invention dispersed in a binder resin; and a charge transporting layer 204 disposed on said charge generating layer, said charge transporting layer being formed of a charge transporting material and a binder resin. In an alternative in the case where the light receiving layer is of a functionally divided multilayered structure, the electrophotographic photosensitive member takes such a configuration as shown in FIG. 5 in which the charge generating layer and the charge transporting layer shown in FIG. 4 are reversely positioned.

In the case where the photosensitive layer takes such single layer structure as shown in FIG. 3, the basic mixing ratio with respect to the constituent materials for the photosensitive layer is made such that the charge generating material of the present invention is 2 to 20 parts by weight or preferably 3 to 15 parts by weight versus 100 parts by weight of a binder resin, and a charge transporting material is 40 to 200 parts by weight or preferably 50 to 100 parts by weight versus 100 parts by weight of said binder resin.

In the case of the multilayered structure shown in FIG. 4 or FIG. 5 wherein the charge generating layer is of a resin-dispersed type, the mixing ratio with respect to the constituent materials for the charge generating layer is made such that the charge generating material of the present invention is 5 to 500 parts by weight or preferably 10 to 250 parts by weight versus 100 parts by weight of a binder resin, and the mixing ratio with respect to the constituent materials for the charge transporting layer is made such that a charge transporting material is 10 to 500 parts by weight or preferably 25 to 200 parts by weight versus 100 parts by weight of a binder resin.

The layer thickness in each of the photosensitive members shown in FIGS. 3 to 5 is properly determined in the following ranges. That is, in the case of the single layered photosensitive member, the thickness of the photosensitive layer is made to be 10 to 50 μm or preferably 15 to 25 μm. Likewise, in the case of the multilayered photosensitive member, the thickness of the charge generating layer is made to be 0.01 to 5 μm or preferably 0.1 to 3 μm, and the thickness of the charge transporting layer is made to be 2 to 100 μm or preferably 5 to 30 μm.

As for each of the photosensitive members above described, a proper modification can be made. For example, a barrier layer can be disposed between the conductive substrate and the photosensitive layer or the charge generating layer. The barrier layer disposed between the conductive substrate and the photosensitive layer or the charge generating layer serves to exhibit an adhesion and/or an appropriate barrier property with respect to charge injection. The barrier layer is formed using an appropriate material such as casein, polyvinyl alcohol, polyamide resin, etc. The thickness thereof is properly determined in the range of some micron meters to some tens micron meters as long as the characteristics of the photosensitive member are not hindered.

Other than this, it is possible to dispose a surface protective layer in order to improve the durability of the photosensitive member.

In the following, explanation will be made of the constituent materials of the electrophotographic photosensitive member according to the present invention.

(Substrate)

As the substrate, there can be used various members having a conductivity. Specific examples are metal members of aluminum, copper, platinum, gold, silver, vanadium, molybdenum, chromium, cadmium, titanium, nickel, palladium, indium, stainless steel, or brass, plastic members evaporated or laminated with these metals on their surface, and glass members applied with aluminum iodide, tin oxide, or indium oxide on their surface. Any of these conductive members may be of a sheet-like shape or a drum-like shape. It is desired for the substrate to be such that is conductive by itself or has a conductive surface and that has a mechanical strength to be sufficiently durable upon use.

(Charge Transporting Material)

As the charge transporting material, there can be used any conventional material. As such material, there can be illustrated oxazole compounds such as 2,5-di(4-dimethylaminophenyl)-1,3,4-oxadiazole, etc., styryl compounds such as 9-(4-diethylaminostyryl)anthracene, etc., carbazole compounds such as polyvinylcarbazole, etc., pyrazoline compounds such as 1-phenyl-3-(p-dimethylaminophenyl)pyrazoline, etc., nitrogen-containing cyclic compounds and condensed polycyclic compounds such as indole compounds, oxazole compounds, isooxazole compounds, thiazole compounds, thiadiazole compounds, imidazole compounds, pyrazole compounds, triazole compounds, etc., and hydrazone compounds. These charge generating materials may be used either singly or in combination of two or more of them. In the case of using a charge generating material having a film-forming property such as polyvinylcarbazole or the like, it is not always necessary to use a binder resin.

(Binder Resin)

As the binder resin to be used in each of the photosensitive layer, the charge generating layer and the charge transporting layer, there can be used various resins. As such resin, there can be illustrated styrenic polymers, acrylic polymers, styrene-acrylic copolymers, olefinic polymers such as polyethylene, ethylene-vinyl acetate copolymer, chlorinated polyethylene, polypropylene, ionomer, etc., polyvinyl chloride, vinyl chloride-vinyl acetate copolymer, polyester, alkyd resin, polyamide, polyurethane, epoxy resin, polycarbonate, polyarylate, polysulfone, diallyl phthalate resin, silicone resin, ketone resin, polyvinyl butyral resin, polyether resin, phenol resin, and photo-setting resins such as urethane acrylate, epoxy acrylate, etc. These binder resins may be used either singly or in combination of two or more of them.

(Sensitizer and other additives)

As the charge generating material, the bis-azo compound according to the present invention is used. But it is possible to additionally use a conventional charge generating material.

As such charge generating material, there can be illustrated selenium, selenium-tellurium, amorphous silicon, pyrylium salt, conventional bis-azo compounds, ansanthrone compounds, phthalocyanine compounds, indigo compouds, triphenylmethane compounds, styrenic compounds, toluidine compounds, pyrazoline compounds, perylene compounds, quinacridone compounds, etc.

It is possible to use a conventional sensitizer such as terphenyl, halonaphthoquinones, acenaphthylenes, etc. together with the above charge generating material in order to improve the sensitivity of the charge generating layer.

(Organic Solvent)

An appropriate solvent is used in the case of forming each of the charge generating layer and the charge transporting layer by means of a coating process. As such solvent, there can be used various organic solvents. Specific examples are alcohols such as methanol, ethanol, isopropanol, butanol, etc., aliphatic hydrocarbons such as n-hexane, octane, cyclohexane, etc., aromatic hydrocarbons such as benzene, toluene, xylene, etc., halogenated hydrocarbons such as dichloromethane, dichloroethane, carbon tetrachloride, chlorobenzene, etc., ethers such as dimethyl ether, diethyl ether, tetrahydrofuran, ethylene glycol dimethyl ether, diethylene glycol dimethyl ether, etc., ketones such as acetone, methyl ethyl ketone, cyclohexanone, etc., esters such as ethyl acetate, methyl acetate, etc., dimethylformamide, dimethylsulfoxide, etc. These solvents may be used either singly or in combination of two or more of them.

(Film Formation)

Each of the charge generating layer and the charge transporting layer may be formed by means of a coating process. For instance, the charge generating layer may be formed by properly adjusting the foregoing charge generating material and the foregoing binder resin by means of roll mill, ball mill, attritor, paint shaker, or ultrasonic dispersing device, applying the coating composition by a conventional coating method, followed by drying. Such coating method can include a wire bar coating method, a dip coating method, a doctor blade coating method and a spray coating method. In an alternative, as above described, the charge generating layer may be formed by evaporating the foregoing charge generating material.

Production of the electrophotographic photosensitive member

Explanation will be made of the electrophotographic photosensitive member according to the present invention while illustrating examples of producing it and also of the usability thereof.

In the following production examples, there were prepared electrophotographic photosensitive members of the single layered type shown in FIG. 3 and the multilayered type shown in FIG. 4.

There were used the following bis-azo compounds in the production examples. In the comparative production example, there was used chlorodian blue known as a charge generating material.

In Production Example 1
the bis-azo compound obtained in Synthesis Example 1

In Production Example 2
the bis-azo compound obtained in Synthesis Example 2

In Production Example 3
the bis-azo compound obtained in Synthesis Example 3

In Production Example 4
the bis-azo compound obtained in Synthesis Example 4

In Production Example 5
the bis-azo compound obtained in Synthesis Example 5

In Production Example 6
the bis-azo compound obtained in SYnthesis Example 6

In Production Example 7
the bis-azo compound obtained in Synthesis Example 7

In Production Example 8
the bis-azo compound obtained in Synthesis Example 8

In Production Example 9
the bis-azo compound obtained in Synthesis Example 9

In Production Example 10
the bis-azo compound obtained in Synthesis Example 10

In Production Example 11
the bis-azo compound obtained in Synthesis Example 11

In Production Example 12
the bis-azo compound obtained in Synthesis Example 12

In Production Example 13
the bis-azo compound obtained in Synthesis Example 13

In Production Example 14
the bis-azo compound obtained in Synthesis Example 14

In Production Example 15
the bis-azo compound obtained in Synthesis Example 15

In Production Example 16
the bis-azo compound obtained in Synthesis Example 16

In Production Example 17
the bis-azo compound obtained in Synthesis Example 17

In Production Example 18
the bis-azo compound obtained in Synthesis Example 18

In Production Example 19
the bis-azo compound obtained in Synthesis Example 19

In Production Example 20
the bis-azo compound obtained in Synthesis Example 20

In Production Example 21
the bis-azo compound obtained in Synthesis Example 21

In Production Example 22
the bis-azo compound obtained in Synthesis Example 22 In Comparative Production Example clorodian blue In each of the production examples and also in the comparative production example, the electrophotographic photosensitive members were prepared respectively in the following manner.

Preparation of th e electrophotographic photosensitive member of the single layered type A mixture of 8 parts by weight of one Of the bis-azo compounds obtained in Synthesis Examples 1 to 22, 100 parts by weight of 3,3'-dimethyl-N,N,N',N'-tetrakis-4-methylphenyl-(1,1'-biphenyl)-4,4'-diamine as the charge transporting material, 100 parts by weight of poly-(4,4'- cyclohexylidenediphenyl)carbonate (trademark name : IUPILON Z200, produced by Mitsubishi Gas Chemical Company, Inc.) as the binder resin, and a predetermined amount of tetrahydrofuran was introduced into a ultrasonic dispersing device wherein the mixture was well mixed and dispersed, to thereby obtain a coating composition. The coating composition thus obtained wa applied onto the surface of an aluminum cylinder, followed by heat drying at 100° C. for 30 minutes in dark, whereby an electrophotographic photosensitive member of a drum type having a 4 μm thick single photosensitive layer was obtained.

Preparation of the electrophotographic photosensitive member of the multilayered type A mixture of 100 parts by weight of polyvinyl butyral (trademark name : S-lec BL1, produced by Sekisui Chemical Company Inc.) as the binder resin, 100 parts by weight of one of the bis-azo compounds obtained in Synthesis Examples 1 to 22 as the charge generating material, and a predetermined amount of tetrahydrofuran was introduced into a ball mill wherein the mixture was mixed while stirring for 24 hours, to thereby obtain a coating composition for the formation of the charge generating layer. The coating composition was applied onto the surface of an aluminum cylinder (of 78 mm in diameter) by a dip coating method, followed by heat drying at 110° C. for 30 minutes, whereby an about 0.5 μm thick charge generating layer was formed.

Then, a mixture of 100 parts by weight of polycarbonate resin (trademark name : IUPILON, produced by Mitsubishi Gas Chemical Company Inc.) as the binder resin, 100 parts by weight of 3,3'-dimethyl-N,N,N',N'-tetrakis-4-methylphenyl-(1,1'-biphenyl)-4,4'-diamine as the charge transporting material, and a predetermined amount of toluene was introduced into a homomixer wherein the mixture was well mixed, to thereby obtain a coating composition for the formation of the charge transporting layer. The coating composition thus obtained was applied onto the surface of the previously formed charge generating layer by a dip coating method, followed by heat drying at 90° C. for 30 minutes, whereby an about 20 μm thick charge transporting layer was formed. Thus, there was obtained an electrophotographic photosensitive member of the multilayered type.

(Evaluation)

As for each of the resultant electrophotographic photosensitive members obtained in each of the production examples and the comparative production example, its initial surface potential (Vsp), half decay energy (E1/2) and residual potential were measured and its usability was evaluated.

Measurement of the initial surface potential Vsp

Each of the electrophotographic photosensitive members was set to a commercially available electrostatic reproduction testing apparatus (trademark name : CYNCIA 30M, produced by Gentec Co., Ltd.), wherein the surface thereof was subjected to charging with a positive or negative polarity to measure the surface potential Vsp (V). In the testing apparatus, in order to make the charging condition to be constant, the flow-in current value was controlled and a applying voltage was adjusted so that the surface potential became 800 to 850 V, with respect to each sample.

Measurement of the half decay energy E1/2 and the residual potential rp

As for each of the electrophotographic photosensitive members, the electrophotographic photosensitive member under charged state in the foregoing electrostatic reproduction testing apparatus was subjected to exposure at an exposure intensity of 101 lux using the halogen lump as the exposure light source of the apparatus to measure a period of time until the surface potential Vsp (V) became one second. Based on the measured result, the half decay energy E1/2 (lux.sec.) was calculated.

Further, the surface potential after the lapse of 0.15 second since the exposure started was made to be a residual potential Vrp (V).

The measured results relative to the electrophotographic characteristics were collectively shown in Table 2.

In addition, each of the electrophotographic photosensitive members of the single layered type obtained in Production Examples 15, 20, 21 and 22 was set to a commercially available electrophotographic copying machine DC-1655, produced by Mita Industrial Co., Ltd., wherein image-forming test was performed by repeating reproduction process 50,000 times. In the DC-1655 machine, the applying voltage was adjusted so that the surface potential became to be in the range of 800 V 30 V.

In any of the cases, a stable copied image was continuously obtained.

Each of the electrophotographic photosensitive members of the single layered type which had been subjected to the above 50,000 times reproduction processes was set to the electrostatic reproduction testing apparatus (trademark name : CYNCIA 30M, produced by Gentec Co., Ltd.), to measure the surface potential (Vsp), the half decay energy (E1/2) and the residual potential (Vrp). The measured results obtained were collectively shown in Table 3.

From the results shown in Tables 2 and 3, the following facts were found. That is, any of the photosensitive members of the single layered type and the multilayered type in which the bis-azo compounds of the present invention are used as the charge generating material is markedly small in residual potential in comparison with that of the comparative photosensitive member and excels in stability against light, is small in half decay energy E1/2, stably exhibits a high sensitivity and excels in durabiliy; and the bis-azo compounds are suitable as the charge generating material.

TABLE 1

| No. | R¹ | R² | A | Z |
|---|---|---|---|---|
| 1 | —CH₃ | —CH₃ | 3-hydroxy-4-methyl-N-phenyl-2-naphthamide | O |
| 2 | —OCH₃ | —CH₃ | 3-hydroxy-2-methyl-N-methylaniline | O |
| 3 | —CH₃ | —C₂H₅ | 2-methyl-N-methylaniline | O |
| 4 | —COOH | —CH₂OH | 2-hydroxy-5-methylphenol (2,4-xylenol) | O |
| 5 | —Cl | —Cl | 2-methyl-5-(phenylsulfonylamino)benzenesulfonamide | O |
| 6 | —CN | —CN | 4-methyl-N-ethylsulfonylaniline | O |
| 7 | —CH₃ | —CH₃ | 4-amino-1-methyl-3-hydroxynaphthalene | O |
| 8 | —CH₃ | —CH₃ | 4-(dimethylamino)-1,7-dimethylnaphthalene | O |

TABLE 1-continued
| No. | R¹ | R² | A | Z |
|---|---|---|---|---|
| 9 | —CH₃ | —CH₃ | 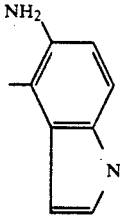 | O |
| 10 | —CH₃ | —CH₃ | 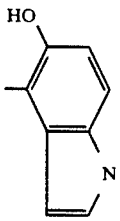 | O |
| 11 | —CH₃ | 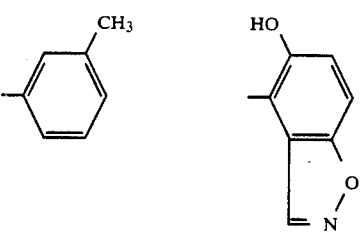 | 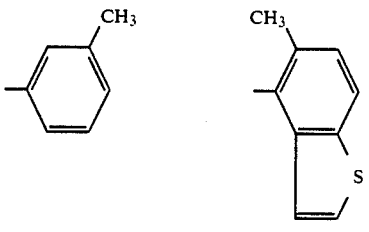 | O |
| 12 | —C₂H₅ | 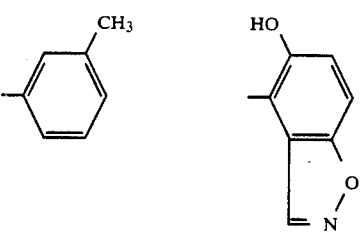 | 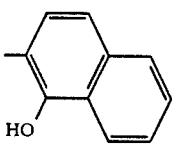 | O |
| 13 | —CH₃ | —CH₃ | 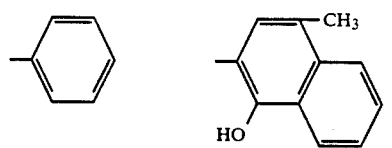 | O |
| 14 | —Cl | 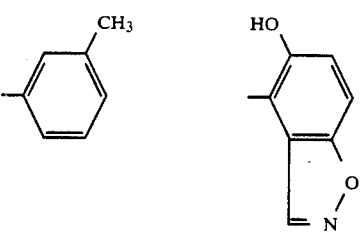 | 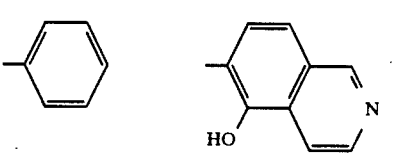 | O |
| 15 | —CH₃ | 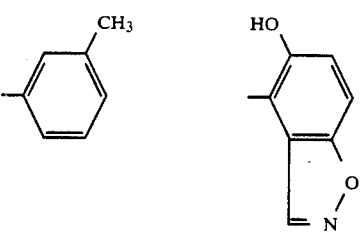 | 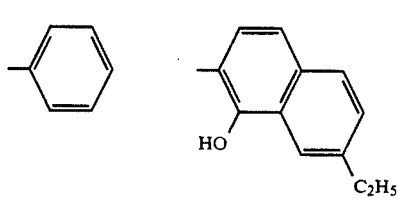 | O |
| 16 | —CN | 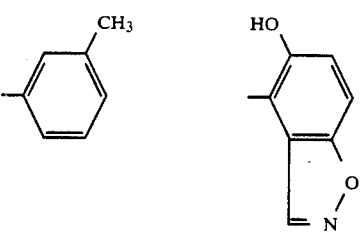 | 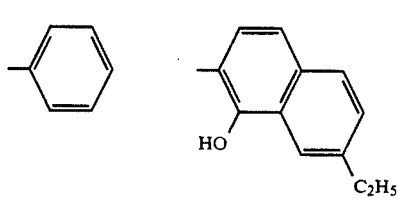 | O |

TABLE 1-continued
| No. | R¹ | R² | A | Z |
|---|---|---|---|---|
| 17 | 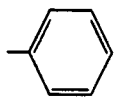 | 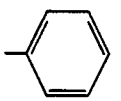 | 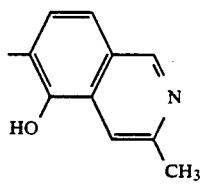 | O |
| 18 | —CH₃ | —CH₃ | 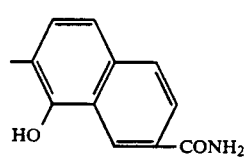 | O |
| 19 | —CH₃ | —CH₃ | 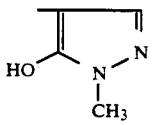 | O |
| 20 | —CH₃ | —CH₃ | 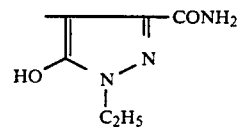 | O |
| 21 | —CH₃ | 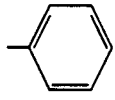 | 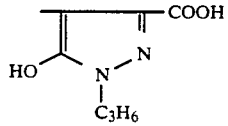 | O |
| 22 | 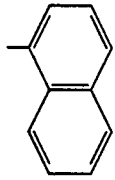 | 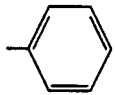 | 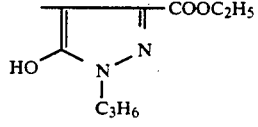 | O |
| 23 | —CH₃ | —CH₃ | 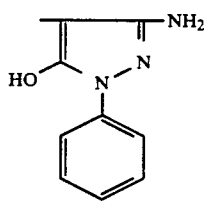 | O |
| 24 | —COOCH₃ | —CH₃ | 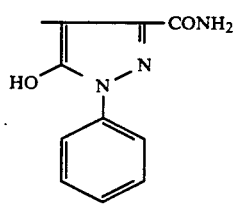 | O |

TABLE 1-continued

| No. | R¹ | R² | A | Z |
|---|---|---|---|---|
| 25 | —CH₃ | —CH₃ | (naphthalimide with CH₃, OH, and N-CH₃) | O |
| 26 | —CH₃ | —CH₃ | (naphthalimide with OH, CH₃, and N-phenyl) | O |
| 27 | —CH₃ | —CH₃ | (fused naphthalene ring with OH, CH₃ and bicyclic N-containing ring) | O |
| 28 | (1-naphthyl) | (1-naphthyl) | (fused naphthalene ring with HO, CH₃ and bicyclic N-naphthyl ring) | O |
| 29 | —CH₃ | —CH₃ | (naphthalene with HO, CH₃, and CONH-phenyl) | S |

TABLE 1-continued

| No. | R¹ | R² | A | Z |
|---|---|---|---|---|
| 30 | —CH₃ | —CH₃ | (HO-, CH₃-substituted phenyl) | S |

TABLE 2

| | layer structure | charging | Vsp (V) | Vrp (V) | E½ (lux sec) |
|---|---|---|---|---|---|
| Production Example 1 | single layer | + | 840 | 32 | 0.69 |
| | multilayer | − | 823 | 27 | 0.61 |
| Production Example 2 | single layer | + | 820 | 35 | 0.68 |
| | multilayer | − | 836 | 25 | 0.65 |
| Production Example 3 | single layer | + | 843 | 40 | 0.71 |
| | multilayer | − | 820 | 28 | 0.66 |
| Production Example 4 | single layer | + | 815 | 60 | 0.78 |
| | multilayer | − | 835 | 55 | 0.75 |
| Production Example 5 | single layer | + | 840 | 78 | 0.93 |
| | multilayer | − | 837 | 60 | 0.80 |
| Production Example 6 | single layer | + | 820 | 80 | 0.82 |
| | multilayer | − | 830 | 50 | 0.70 |
| Production Example 7 | single layer | + | 810 | 92 | 1.01 |
| | multilayer | − | 805 | 78 | 0.90 |
| Production Example 8 | single layer | + | 850 | 30 | 0.65 |
| | multilayer | − | 843 | 25 | 0.59 |
| Production Example 9 | single layer | + | 820 | 36 | 0.70 |
| | multilayer | − | 810 | 29 | 0.65 |
| Production Example 10 | single layer | + | 830 | 80 | 0.88 |
| | multilayer | − | 810 | 50 | 0.72 |
| Production Example 11 | single layer | + | 825 | 75 | 0.84 |
| | multilayer | − | 808 | 65 | 0.76 |
| Production Example 12 | single layer | + | 832 | 90 | 1.03 |
| | multilayer | − | 840 | 80 | 0.87 |
| Production Example 13 | single layer | + | 850 | 65 | 0.74 |
| | multilayer | − | 832 | 70 | 0.70 |
| Production Example 14 | single layer | + | 827 | 55 | 0.68 |
| | multilayer | − | 840 | 70 | 0.62 |
| Production Example 15 | single layer | + | 840 | 32 | 0.69 |
| | multilayer | − | 823 | 27 | 0.61 |
| Production Example 16 | single layer | + | 850 | 101 | 0.90 |
| | multilayer | − | 865 | 72 | 0.83 |
| Production Example 17 | single layer | + | 840 | 92 | 0.96 |
| | multilayer | − | 830 | 83 | 0.92 |
| Production Example 18 | single layer | + | 832 | 55 | 0.70 |
| | multilayer | − | 840 | 57 | 0.63 |
| Production Example 19 | single layer | + | 840 | 60 | 0.84 |
| | multilayer | − | 827 | 55 | 0.80 |
| Production Example 20 | single layer | + | 830 | 52 | 0.77 |
| | multilayer | − | 860 | 40 | 0.68 |
| Production Example 21 | single layer | + | 820 | 21 | 0.72 |
| | multilayer | − | 833 | 35 | 0.75 |
| Production Example 22 | single layer | + | 805 | 30 | 0.68 |
| | multilayer | − | 811 | 20 | 0.59 |
| Comparative Production Example 1 | single layer | + | 721 | 420 | 7.24 |
| | multilayer | − | 730 | 372 | 5.32 |

TABLE 3

| | Vsp (V) | Vrp (V) | E½ (lux · ese) |
|---|---|---|---|
| Experimental Example 15 | 830 (840) | 35 (32) | 0.73 (0.69) |
| Experimental Example 20 | 830 (850) | 58 (52) | 0.79 (0.77) |
| Experimental Example 21 | 840 (820) | 25 (21) | 0.73 (0.72) |
| Experimental Example 22 | 820 (805) | 40 (30) | 0.74 (0.68) |

*the value mentioned in the parentheses in the table is a value initially measured

Figure 1:
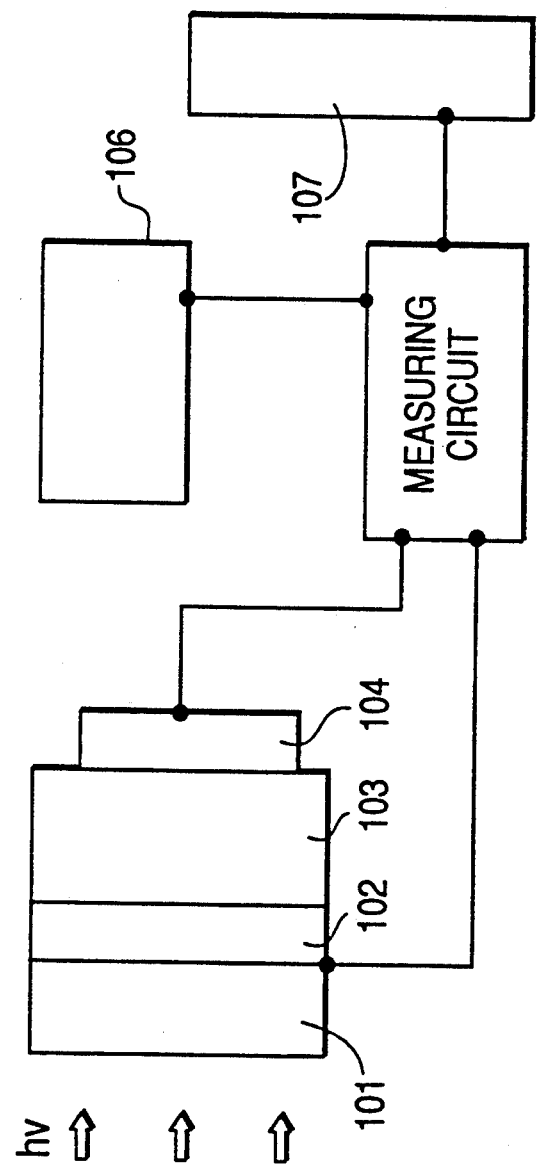
FIGS. 1 and 2 are schematic explanatory diagrams respectively illustrating the constitution of a measuring device for measuring the charge generating efficiency of the bis-azo compounds synthesized in the present invention.
Figure 2:
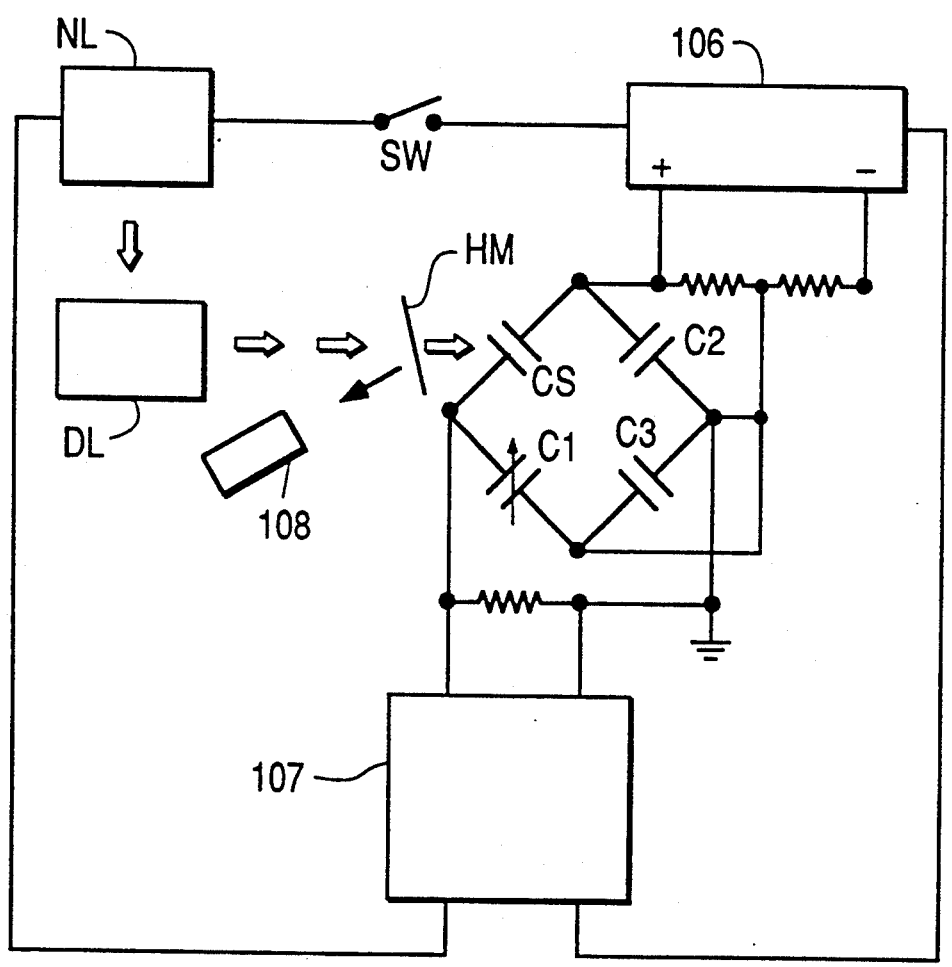
Figure 3:
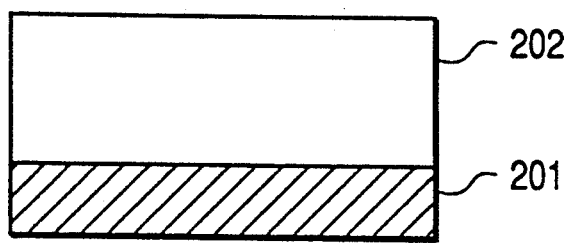
FIGS. 3 and 4 are schematic views respectively illustrating the configuration of the organic electrophotographic photosensitive member according to the present invention.
Figure 4:
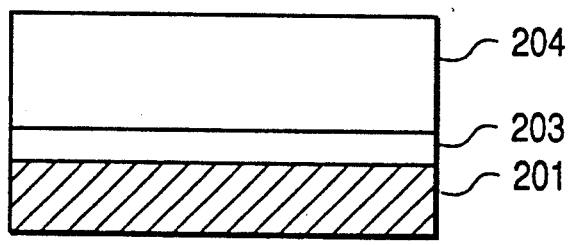
Figure 5:
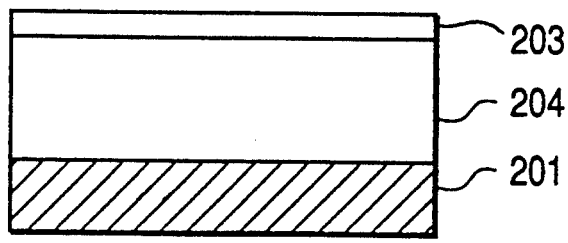

I claim:

1. A bis-azo compound represented by the following general formula (I).

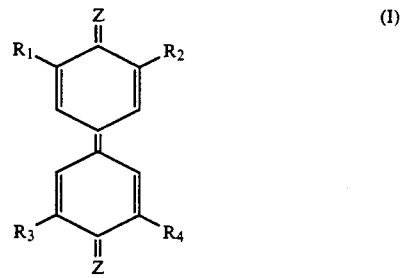

(I)

wherein, two of the substituent groups $R_1$ to $R_4$ are respectively an azo group having a coupler residue which is bonded either directly or through a phenyl ring to the diphenoquinone skeleton, and the remaining two substituent groups are respectively hydrogen atom, alkyl group, alkenyl group, hydroxyl group, alkoxy group, carboxyl group, aryl group, halogen atom or cyano group wherein the two substituent groups may be identical or different each other, and Z is oxygen atom or sulfur atom.

2. An electrophotographic photosensitive member comprising a conductive substrate and a light receiving layer disposed on said conductive substrate, characterized in that said light receiving layer contains a bis-azo compound represented by the following general formula (I).

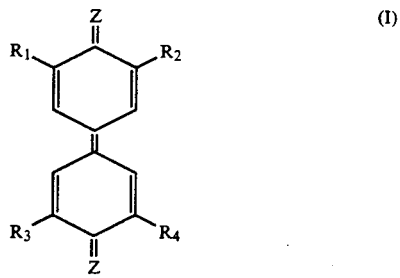

(I)

wherein, two of the substituent groups $R_1$ to $R_4$ are respectively an azo group having a coupler residue which is bonded either directly or through a phenyl ring to the diphenoquinone skeleton, and the remaining two substituent groups are respectively hydrogen atom, alkyl group, alkenyl group, hydroxyl group, alkoxy group, carboxyl group, aryl group, halogen atom or cyano group wherein the two substituent groups may be identical or different each other, and Z is oxygen atom or sulfur atom.

* * * * *